United States Patent
Fujimoto

(10) Patent No.: US 7,899,211 B2
(45) Date of Patent: Mar. 1, 2011

(54) OBJECT DETECTING SYSTEM AND OBJECT DETECTING METHOD

(75) Inventor: Kazumi Fujimoto, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1127 days.

(21) Appl. No.: 11/605,322

(22) Filed: Nov. 29, 2006

(65) Prior Publication Data
US 2007/0127778 A1 Jun. 7, 2007

(30) Foreign Application Priority Data

Dec. 7, 2005 (JP) .............................. 2005-352831
Aug. 22, 2006 (JP) .............................. 2006-225468

(51) Int. Cl.
G06K 9/00 (2006.01)
B60Q 1/00 (2006.01)
G08G 1/16 (2006.01)

(52) U.S. Cl. ........................ 382/104; 340/436; 701/301

(58) Field of Classification Search ................ 382/103, 382/104, 107; 340/436, 3.41, 3.43, 903, 340/961, 933; 701/25, 96, 300, 301, 213
See application file for complete search history.

(56) References Cited

U.S. PATENT DOCUMENTS

| | | | |
|---|---|---|---|
| 6,246,961 B1 * | 6/2001 | Sasaki et al. ................. | 701/301 |
| 6,411,898 B2 * | 6/2002 | Ishida et al. ................. | 701/211 |
| 7,437,244 B2 * | 10/2008 | Okada ......................... | 701/301 |
| 2006/0078165 A1 | 4/2006 | Watanabe | |

FOREIGN PATENT DOCUMENTS

| | | |
|---|---|---|
| EP | 1 796 042 A2 | 6/2007 |
| JP | 2004-056763 | 2/2004 |
| JP | 2004-278250 | 10/2004 |
| JP | 2004-279394 | 10/2004 |

OTHER PUBLICATIONS

Enkelmann, "Obstacle Detection by Evaluation of Optical Flow Fields from Image Sequences", *Image and Vision Computing*; XP024237949;vol. 9, No. 3; Jun. 1, 1991, pp. 160-168.

(Continued)

*Primary Examiner*—Abolfazl Tabatabai
(74) *Attorney, Agent, or Firm*—Drinker Biddle & Reath LLP

(57) ABSTRACT

An object detecting system includes an imaging device disposed on a vehicle and a controller that receives a two-dimensional image, which represents a scene ahead of the vehicle, from the imaging device. The controller includes a feature extraction unit, a motion-information calculator, a coordinate transformation unit, and an object-attribute determination unit. The feature extraction unit reads the image and extracts the edges of a feature in the image. The motion-information calculator evaluates the feature in the image and outputs feature velocity information for each image pixel that shows the edges of the feature. The coordinate transformation unit reads two-dimensional position coordinates of the image pixels and outputs transformed three-dimensional position coordinates. And the object-attribute determination unit determines, based on the transformed three-dimensional position coordinates and on the feature velocity information, whether the feature is a moving object.

13 Claims, 13 Drawing Sheets

OTHER PUBLICATIONS

Niemann et al., "Integrated Motion and Geometry Based Obstacle Detection in Image Sequences of Traffic Scenes", *Proceedings of the Spie*; XP008052435;vol. 2736, Apr. 8, 1996, pp. 228-239.

Di Stefano et al., "Vehicle Detection and Tracking Using the Block Matching Algorithm", *Recent Advances in Signal Processing and Communications*; XP007903993; Jan. 1, 1999, pp. 160-165.

Gandhi et al., "Detection of Obstacles on Runways Using Ego-Motion Compensation and Tracking of Significant Features", *Image and Vision Computing Elsevier Netherlands*; XP002507324;vol. 18, No. 10; Jul. 2000, pp. 805-815.

* cited by examiner

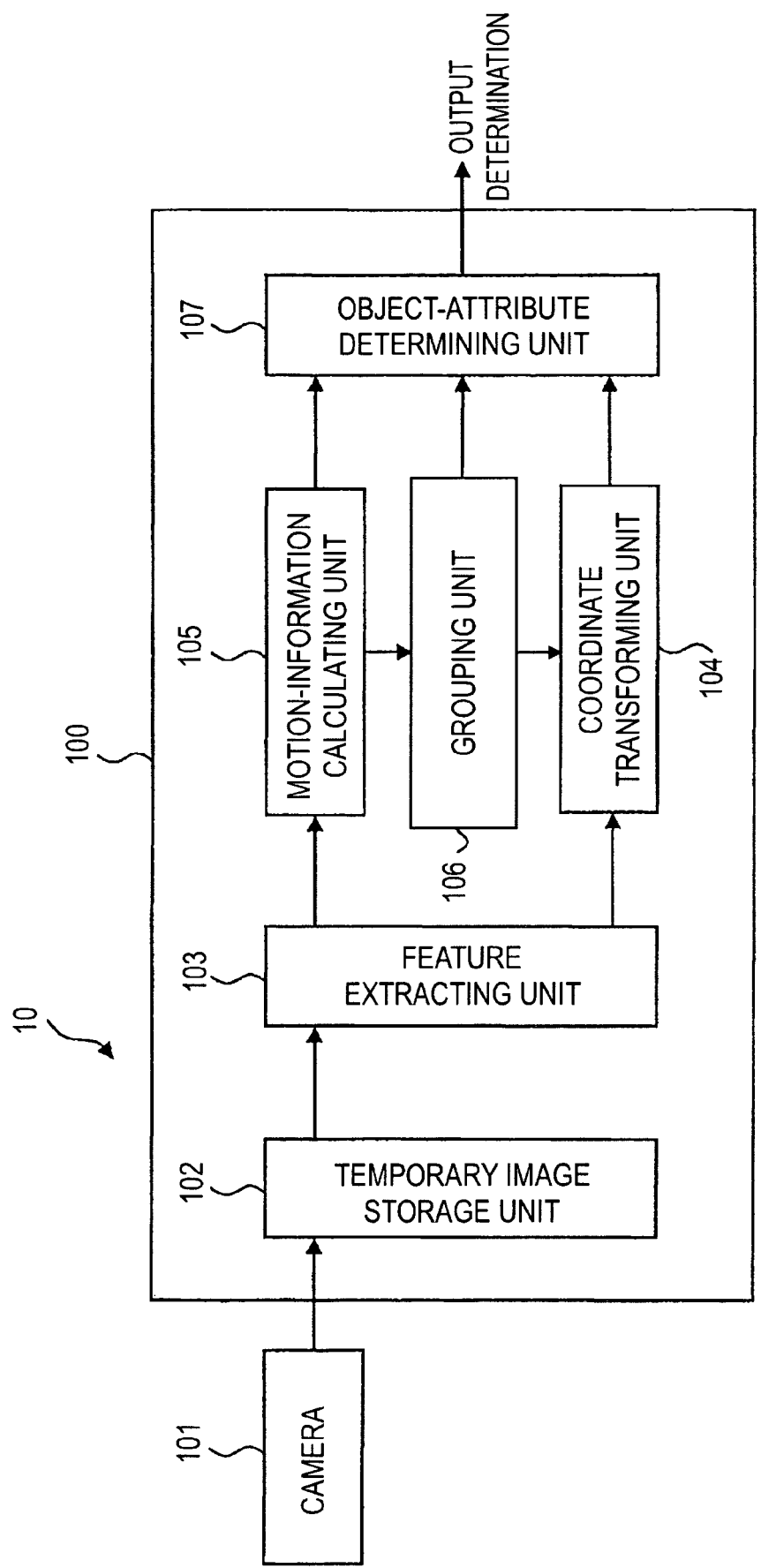

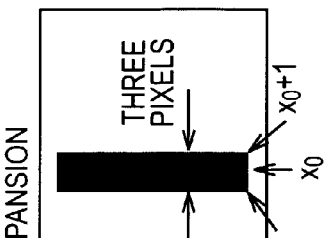
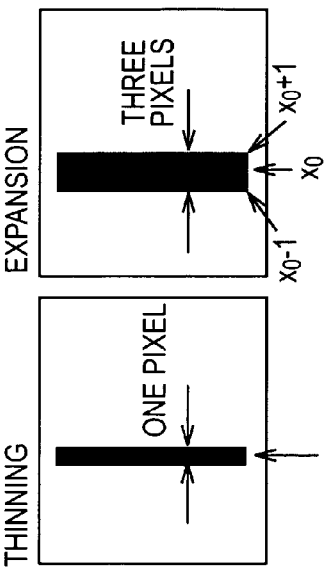
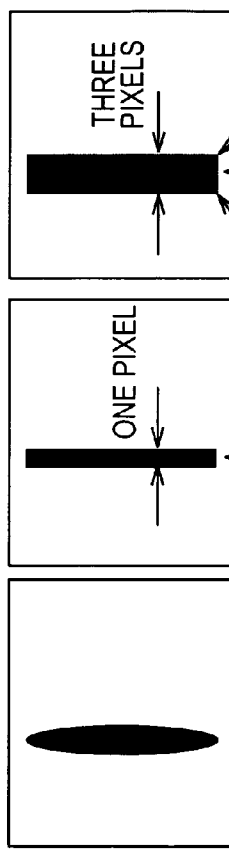
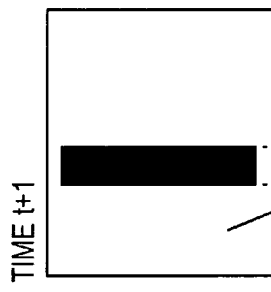
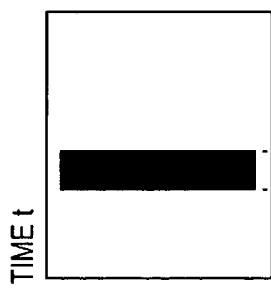
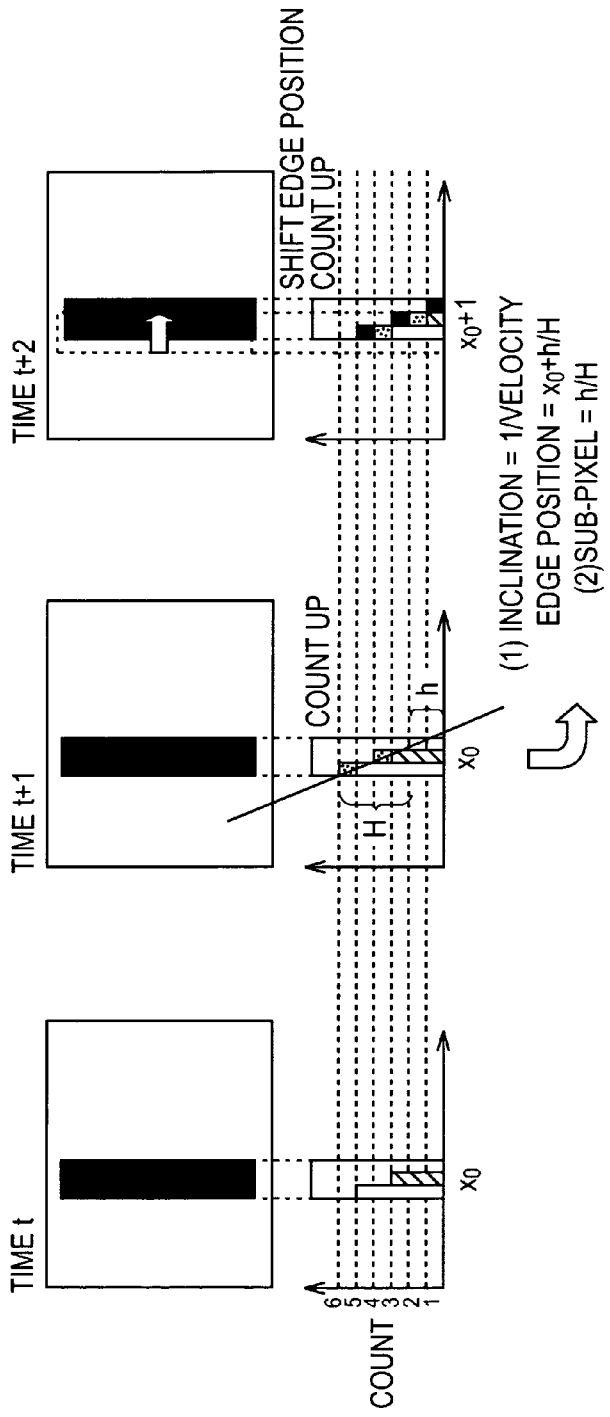

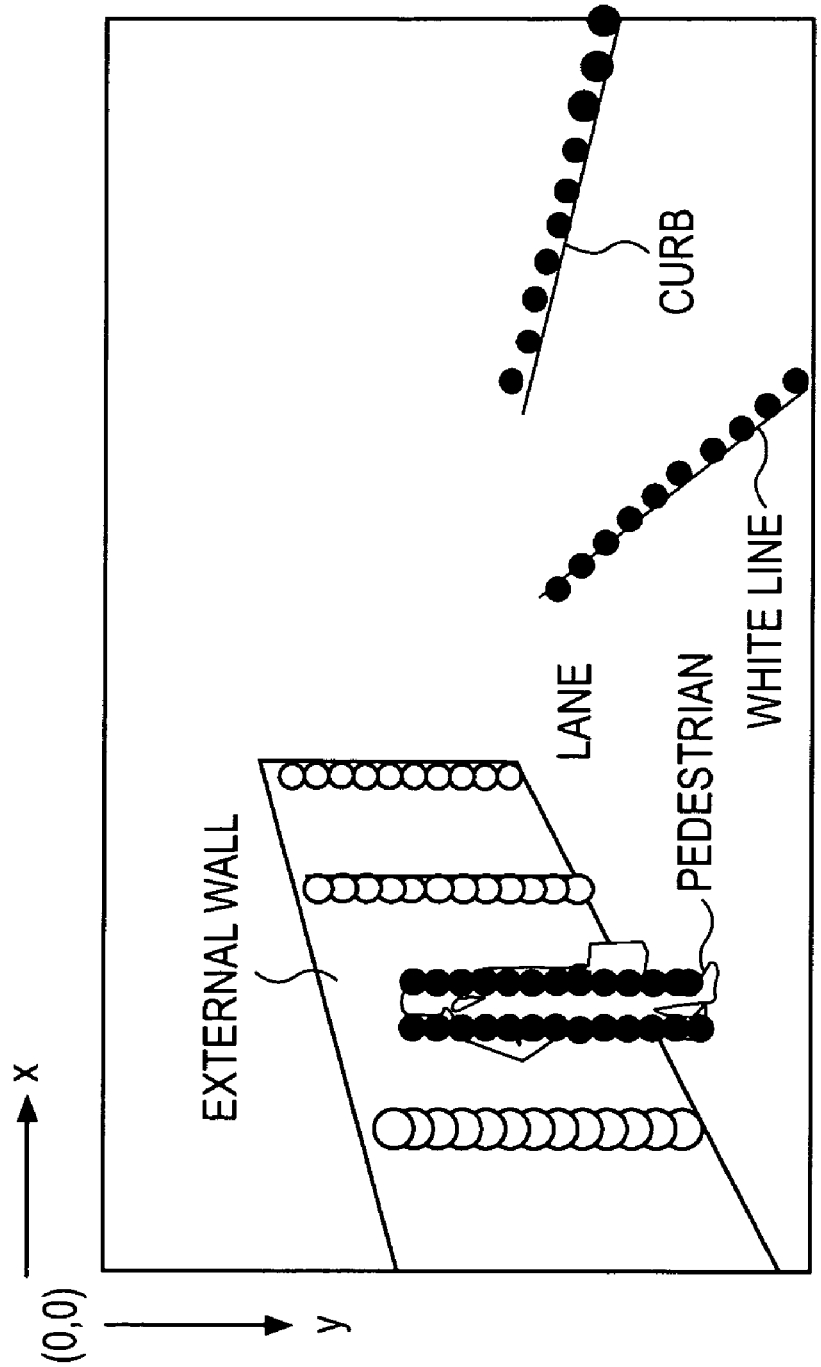

OBJECT DETECTING SYSTEM AND OBJECT DETECTING METHOD

CROSS-REFERENCE TO RELATED APPLICATIONS

This application claims priority under 35 U.S.C. §119 to Japanese Patent Application No. 2005-352831, filed on Dec. 7, 2005, and to Japanese Patent Application No. 2006-225468, filed on Aug. 22, 2006, both of which are incorporated by reference herein in their entirety.

BACKGROUND OF THE INVENTION

1. Field of the Invention

The present invention relates to an object detecting system and an object detecting method.

2. Description of the Related Art

A related object detecting system calculates an optical flow (a vector that represents motion on an image captured by a vehicle-mounted camera) from the captured image in order to detect a moving object. Also, the motion of the vehicle is estimated from the rotational speed of the wheels and the steering angle of the steering wheel. In addition, a spatial model of the space ahead of the vehicle is generated by calculating the distance to an object existing ahead of the vehicle. On the basis of the optical flow, the motion of the vehicle, and the spatial model, a moving object is detected from the captured image.

In the related object detecting system, a spatial model ahead of the vehicle is generated, and a moving object is detected from a captured image on the basis of the spatial model and the motion of the vehicle. However, the amount of processing time required to estimate the motion of the vehicle and to calculate the distance to the object makes it difficult to detect the moving object at high speed. The problem is the time that it takes to begin detection of the optical flow. In order to estimate the optical flow of the moving object, the related object detecting system needs object movement of more than two pixels per frame in order to detect the object. Since the movement of an object with a high collision possibility is small on the captured image, it may take two or more seconds to detect the movement of an object with a high collision possibility.

SUMMARY OF THE INVENTION

It is an object of the invention to detect one or more objects in an image of a scene ahead of a vehicle, and to determine that any object in the image is a moving object in less than two seconds, and preferably in approximately 0.5 seconds.

In an embodiment, the invention provides an object detecting system for a vehicle that moves along a surface. The object detecting system includes an imaging device disposed on the vehicle and a controller that receives a two-dimensional image from the imaging device. The imaging device captures the image, which represents a scene ahead of the vehicle. The two-dimensional image has a vertical axis that is generally perpendicular to the surface, and has a horizontal axis that is generally parallel to the surface. The controller includes a feature extraction unit, a motion-information calculator, a coordinate transformation unit, and an object-attribute determination unit. The feature extraction unit reads the image received by the controller from the imaging device, and extracts the edges of a feature in the image. The motion-information calculator evaluates the feature in the image and outputs feature velocity information for each image pixel that shows the edges of the feature. The coordinate transformation unit reads two-dimensional position coordinates of the image pixels and outputs transformed three-dimensional position coordinates. The object-attribute determination unit determines whether the feature is a moving object. The determining is based on the transformed three-dimensional position coordinates that the object-attribute determination unit receives from the coordinate transformation unit, and on the feature velocity information that the object-attribute determination unit receives from the motion-information calculator.

In an embodiment, the invention further provides an object detecting system for a vehicle that moves along a surface. The object detecting system includes an imaging device capturing an image representing a scene ahead of the vehicle, and control means for determining in less than two seconds if an object in the image is a moving object.

In an embodiment, the invention further provides an object detecting system that includes image capturing means for capturing an image of a scene ahead of a vehicle, feature extracting means for extracting a feature from the image captured by the image capturing means, motion-information calculating means for calculating feature velocity information about pixels representing the feature, coordinate transforming means for transforming position coordinates of the pixels into three-dimensional position coordinates of a three-dimensional coordinate system, and object-attribute determining means for determining whether the feature is a moving object. The determining by the object-attribute determining means being based on the three-dimensional position coordinates of the pixels and the feature velocity information.

In an embodiment, the invention further provides an object detecting method for detecting a moving object in an image representing a scene ahead of the vehicle. The method includes preparing velocity information about a first set of pixels showing a feature of an object in the image, transforming two-dimensional coordinates of the first set of pixels into three-dimensional coordinates, and determining whether the object is a moving object based on the prepared feature velocity information and on the transformed three-dimensional position coordinates.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 1 is a block diagram showing the configuration of an object detecting system according to a first embodiment of the present invention;

FIGS. 4A to 4F are explanatory views showing steps performed to normalize an extracted edge and to obtain an edge image;

FIG. 5 is an explanatory view of an example of a velocity image;

DESCRIPTION OF THE PREFERRED EMBODIMENTS

Figure 2A:
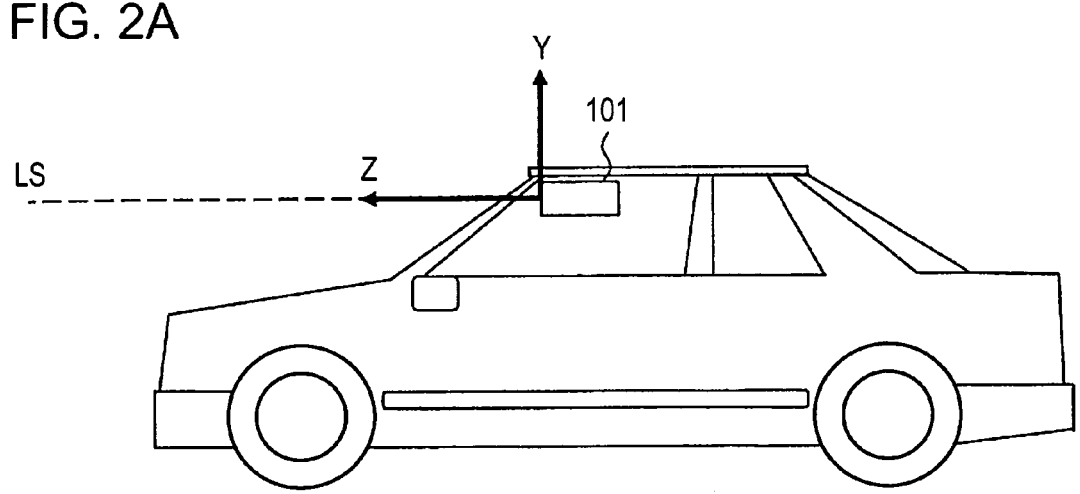
FIGS. 2A and 2B are explanatory views showing an example of an installation position of a camera in a vehicle.

Embodiments of the present invention will be described below with reference to the drawings.

First Set of Preferred Embodiments

FIG. 1 is a block diagram showing the configuration of an object detecting system according to a first embodiment of the present invention.

An object detecting system 10 of the first embodiment is installed in a vehicle, and includes a controller 100 and a camera 101 that captures an image of a scene ahead of the vehicle. The controller 100 includes a temporary image storage unit 102 that temporarily stores an image captured by the camera 101, a feature extracting unit 103 that extracts a feature by processing the image stored in the temporary image storage unit 102, and a coordinate transforming unit 104 that transforms position coordinates of pixels representing the extracted feature into three-dimensional position coordinates in a three-dimensional coordinate system. The controller 100 also includes a motion-information calculating unit 105 that calculates the velocities and movement directions of the pixels in the image as motion information, a grouping unit 106 that groups the pixels on the basis of the calculated velocities of the pixels, and an object-attribute determining unit 107 that determines whether the feature is a two-dimensional object or a three-dimensional object, on the basis of the three-dimensional coordinates obtained by transformation by the coordinate transforming unit 104, the motion information about the pixels calculated by the motion-information calculating unit 105, and grouping information about the pixels grouped by the grouping unit 106. The object-attribute determining unit 107 also determines whether the pixels represent a moving object when they represent a three-dimensional object.

According to preferred embodiments of the present invention, the controller 100 provides a means for determining in less than two seconds if an object in the image is a moving object.

Figure 2B:
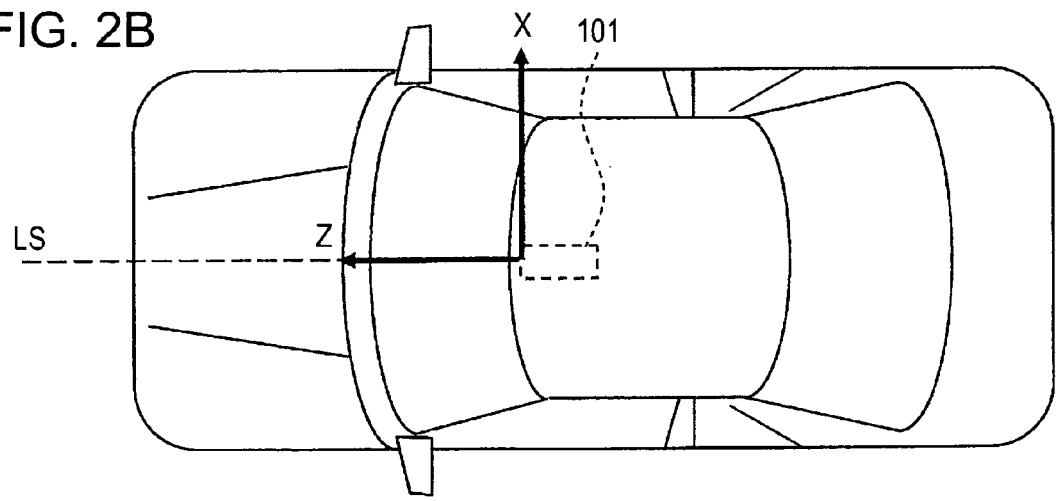

The camera 101 may include any imaging device such as a charge-coupled device (CCD), a complementary-symmetry metal-oxide-semiconductor (CMOS), or any other device that captures images. The camera 101 sequentially captures images of a scene ahead of the vehicle, and outputs the captured images frame by frame to the temporary image storage unit 102. The images are temporarily stored in the temporary image storage unit 102. As shown in FIGS. 2A and 2B, the camera 101 is preferably installed on an upper front side of the cabin of the vehicle, and is located such that the optical axis LS points toward the front of the vehicle (Z-direction), the horizontal axis X of an image-capturing plane is parallel to the road surface, and the vertical axis Y of the image-capturing plane is perpendicular to the road surface. According to preferred embodiments of the present invention, the camera 101 provides a means for capturing an image of a scene ahead of a vehicle.

Figure 3:
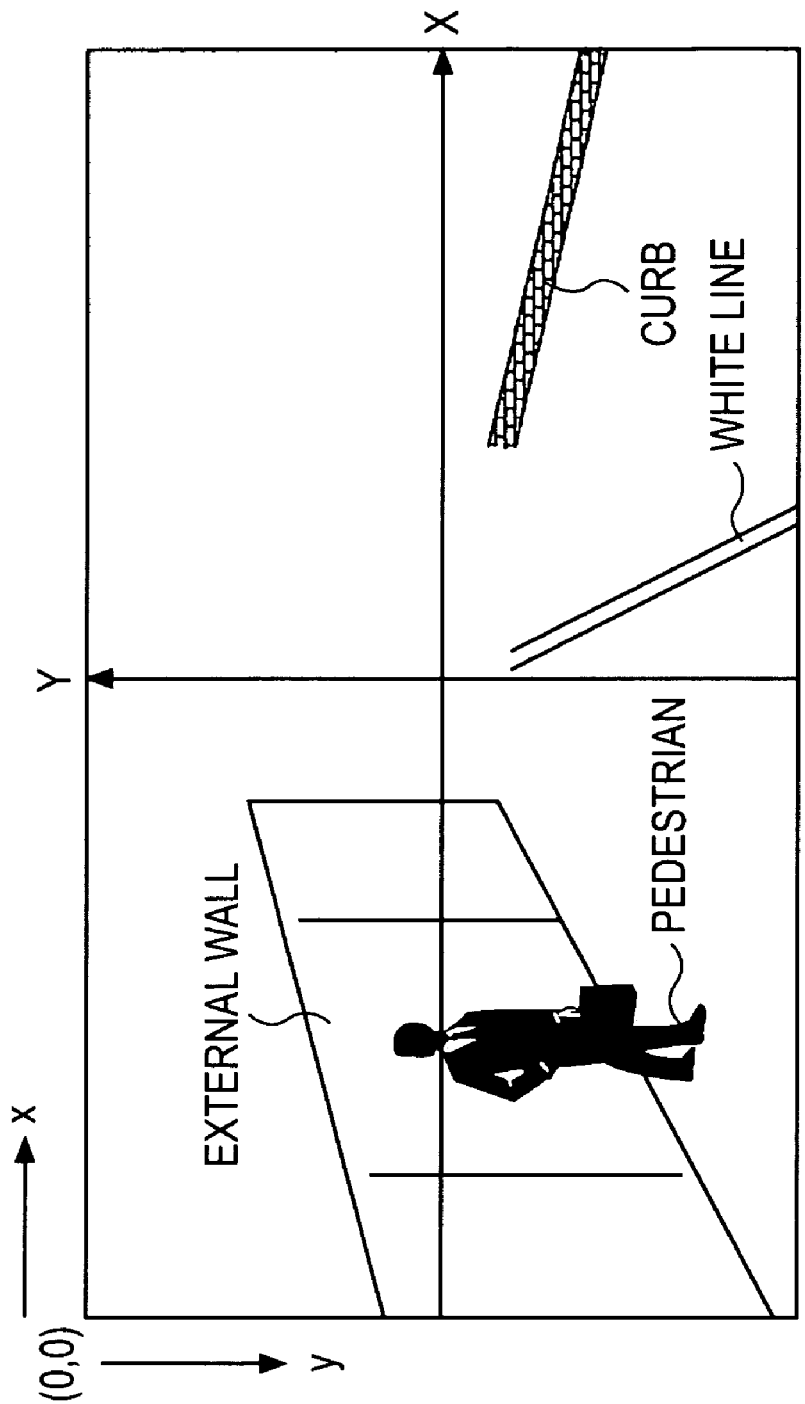
FIG. 3 is an explanatory view of an example of an image captured by the camera.

FIG. 3 shows an example of an image captured by the camera 101 and stored in the temporary image storage unit 102 (e.g., an image of a scene ahead of the vehicle). The captured image shown in FIG. 3 is expressed by an XY coordinate system in which the origin is at the left top of the image, the X-axis extends rightward from the origin, and the Y-axis extends downward from the origin. The image includes lane borders, such as a curb, a white line and an external wall that is located to the left, and includes a pedestrian moving from left to right.

FIGS. 4A to 4F show a specific example of a procedure for obtaining an edge image by normalizing extracted edges.

First, a captured image is subjected to binarization. The feature extracting unit 103 reads the captured image from the temporary image storage unit 102, and binarizes the read image by using a predetermined threshold value, thereby extracting edges of objects existing in the image. Binarization refers to a process in which a pixel lying at a position where an edge is detected is represented by a numerical "one" and a pixel lying at a position where an edge is not detected is represented by a numerical "zero." FIG. 4A is an image, produced by binarization, showing an example of an extracted vertical edge.

Then, the produced binary image is subjected to thinning to reduce the width of the edge and to precisely set the center of the edge. Thinning refers to a process for reducing the width of a detected edge to a predetermined pixel width. In FIG. 4B, the predetermined pixel width for thinning is set to be the width of one pixel. By thus thinning the edge to the predetermined pixel width, the center of the edge is determined. While thinning to one pixel has been described as an example, the predetermined pixel width may correspond to more than one pixel.

Subsequently, the edge is horizontally expanded. Expansion is performed to increase the width of the thinned edge such that the width of the thinned edge becomes constant, for example, the width corresponds to three pixels. Expansion refers to a process in which the edge width is increased from the determined center in an edge movement direction and is also increased from the center in a direction opposite to the edge movement direction. For example, as shown in FIG. 4C, the edge width is increased by one pixel from the edge center $x_0$ in the edge movement direction (in the positive X-axis direction), and is also increased by one pixel from the edge center $x_0$ in a direction opposite to the edge movement direction (in the negative X-axis direction), so that the edge width is increased to three pixels.

By thus performing thinning and expansion, the width of the extracted edge is adjusted to the predetermined width in the edge movement direction for normalization.

According to preferred embodiments of the present invention, the feature extracting unit 103 provides a means for extracting a feature from the captured image.

Then, the normalized edge is subjected to a count-up process. The motion-information calculating unit 105 updates values of pixel counters for the pixels corresponding to the edges. Herein, a pixel counter is set for each pixel corresponding to the edge. When a pixel corresponds to an edge, the value of the corresponding pixel counter is increased by one. When a pixel does not correspond to an edge, the value of the pixel counter is reset to zero. The count value is updated in each of the frames sequentially captured by the camera 101. In this operation, when a pixel corresponds to an edge for a long period, the value of the pixel counter for the pixel is large. When the pixel corresponds to an edge for a short period, the count value of the pixel counter is small.

A change in the count value of the pixel counter represents the direction and amount of movement of the edge. Therefore, the direction and velocity of movement of the edge on the captured image can be calculated from the count value. This calculation will now be described in more detail with reference to FIGS. 4C to 4F.

A count-up process refers to a process in which the value of a memory address at a position where an edge is detected is increased, and in which the value of a memory address at a position where an edge is not detected is reset.

For simplicity, the description will be given under the assumption that the edge moves in the positive X-axis direction. Further, the description also applies to a situation in which the edge moves in the negative X-axis direction, the Y-axis direction, or two-dimensionally.

As shown in FIG. 4C, an edge has its center at the position $x_0$ in a frame, and the edge width is increased from the center position $x_0$ by one pixel to a position $x_{0+1}$ in the edge movement direction, and is increased by one pixel from the center position $x_0$ to a position $x_{0-1}$ in the direction opposite the edge movement direction.

In this case, the count values at the positions $x_{0-1}$, $x_0$ and $x_{0+1}$, i.e., where the edge is detected, are increased by one and the count values are reset at the positions where the edge is not detected.

For example, in FIG. 4D, the edge is detected at the positions $x_{0-1}$, $x_0$ and $x_{0+1}$ at a time t. At the point in time t, the count values have already been incremented and are 5, 3 and 1 at the positions $x_{0-1}$, $x_0$ and $x_{0+1}$, respectively. These count values have been arbitrarily selected solely for the purpose of illustrating an example according to a preferred embodiment.

In FIG. 4E, since the edge does not move at the time t+1, it is detected at the positions $x_{0-1}$, $x_0$ and $x_{0+1}$, and the count value is further increased by one. That is, the count values are 6, 4 and 2 at the positions $x_{0-1}$, $x_0$ and $x_{0+1}$, respectively.

In FIG. 4F, the edge is shifted by one pixel in the positive X-axis direction at the time t+2, and is detected at the positions $x_0$, $x_{0+1}$, and $x_{0+2}$. Therefore, the count value is increased at the positions $x_0$, $x_{0+1}$ and $x_{0+2}$ where the edge is detected, and is reset at the position $x_{0-1}$ where the edge is not detected. That is, the count values are 0, 5, 3 and 1 at the positions $x_{0-1}$, $x_0$, $x_{0+1}$ and $x_{0+2}$, respectively.

In this way, the count value is increased at the positions where the edge is detected, and is reset at the positions where the edge is not detected.

While the count value is initially detected at three positions, namely, the edge center $x_0$, the position $x_{0+1}$ shifted by one pixel from the edge center $x_0$ in the edge movement direction, and the position $x_{0-1}$ shifted by one pixel from the edge center $x_0$ in the direction opposite the edge movement direction in FIG. 4F, it may be detected at any two or more positions with respect to the edge movement direction as long as the inclination of count values can be found, as will be described below.

When the frame rate is set to be sufficiently high, compared with the edge velocity, the edge is detected at the same position a plurality of times between subsequent frames.

For example, the edge is detected at the position $x_0$ twice at the times t and t+1 in the above example. Therefore, when the count value at the position where the edge is detected is increased, it becomes equal to the time (expressed in number of frames) in which the edge is detected at that position. Referring to FIG. 4E, a smallest value h of the count values indicates how many frames through which the edge is placed at the same position from the beginning of movement of the edge.

When the frame rate is sufficiently high compared with the edge velocity, it can be assumed that an object to be detected is moving at a constant velocity. The smallest count value h of the count values at a point in time represents the period of time in which the edge is detected at the position, that is, the number of frames through which the edge remains at the same position after moving.

Subsequently, the velocity and movement direction, and position of the moving edge will be calculated.

First, the inclination of count values in the edge movement direction is calculated, and the velocity, movement direction, and position of the moving edge are calculated on the basis of the inclination.

As it is used herein, inclination H represents (the time elapsed from when the edge attains the position $x_{0-1}$ to the present time)−(the time elapsed after the edge moves to the position $x_{0+1}$). For example, with reference to FIG. 4E, the count values at the positions $x_{0-1}$, $x_0$, and $x_{0+1}$ are 6, 4 and 2, respectively. Therefore, inclination H of the count values can be calculated as 6−2=4, i.e., by subtracting the count value of 2 at $x_{0+1}$ from the count value of 6 at $x_{0-1}$. Therefore, the time (expressed in number of frames) taken for the edge to pass through one pixel including the position $x_0$ is calculated. Accordingly, the inclination H shows the number of frames necessary for the edge to move by one pixel, and the edge velocity 1/H can be calculated from the inclination H of the count values.

In FIG. 4E, four frames are needed for the edge to move by one pixel. Therefore, the edge velocity can be calculated as ¼ (pixels/frame). Similarly, in FIG. 4F, the inclination H is 5−1=4, and the edge velocity is calculated as ¼ (pixels/frame).

The edge movement direction can be determined by the relative magnitudes of the count values. When the edge is moved so as to be detected at a new position, the initial count value is 1 at the new position. This value is the smallest of the obtained count values. Similarly, the greatest of the obtained count values occurs at an established position just before the edge is moved such that the edge is no longer detected at the established position and the count value is reset to 0.

That is, since the obtained count values decrease in magnitude relative to the edge movement direction, and increase in magnitude relative to the opposite of the edge movement direction, the edge movement direction can be determined by the relative magnitudes of the obtained count values at a point in time.

Next, the edge position may be calculated as $x_0$+h/H, when $x_0$ represents the edge center.

For example, in FIG. 4E, the edge velocity is ¼ (pixels/frame), and the edge has been detected at the same position in two subsequent frames, i.e., at the time t and at the time t+1.

Therefore, at the time t+1, the spacing between the edge position and the edge center $x_0$ is calculated as 2 (frames)×¼ (pixels/frame)=½ (pixel).

As described above, the count values at the positions where the edge is detected are increased from 0, and the edge velocity and movement direction can be calculated from the inclination of the count values.

Subsequently, a velocity image is generated in which velocity components of edges lying in the captured image are classified into predetermined group values. FIG. 5 shows an example of a velocity image. According to a preferred embodiment, the pixels of edges whose velocities are detected are shown by circles, and the size of the circles increases as the velocity increases. Further, rightward velocity is shown by black circles, and leftward velocity is shown by white circles, thereby indicating the direction of movement. As they are used herein, the terms "rightward" and "leftward" are with respect to the optical axis LS as it points toward the front of the vehicle (Z-direction), and the term "velocity" is relative to the movement of the vehicle. In the example of FIG. 5, rightward velocity is detected from a curb and a white line on the right side of a lane for the vehicle, and leftward velocity is detected from an external wall on the left side of the lane. Rightward velocity is also detected from a pedestrian moving from left to right on the left side of the lane.

According to preferred embodiments of the present invention, the motion-information calculating unit 105 provides a means for calculating feature velocity information. Preferred embodiments of a motion-information calculating unit are described in U.S. patent application Ser. No. 11/146,041, filed Jun. 7, 2005, Japanese Patent Application Laid-open No. P2004-278250, filed Sep. 24, 2004, and Japanese Patent Application Laid-open No. P2004-279394, filed Sep. 27, 2004, all of which are incorporated by reference herein in their entirety.

Figure 6:
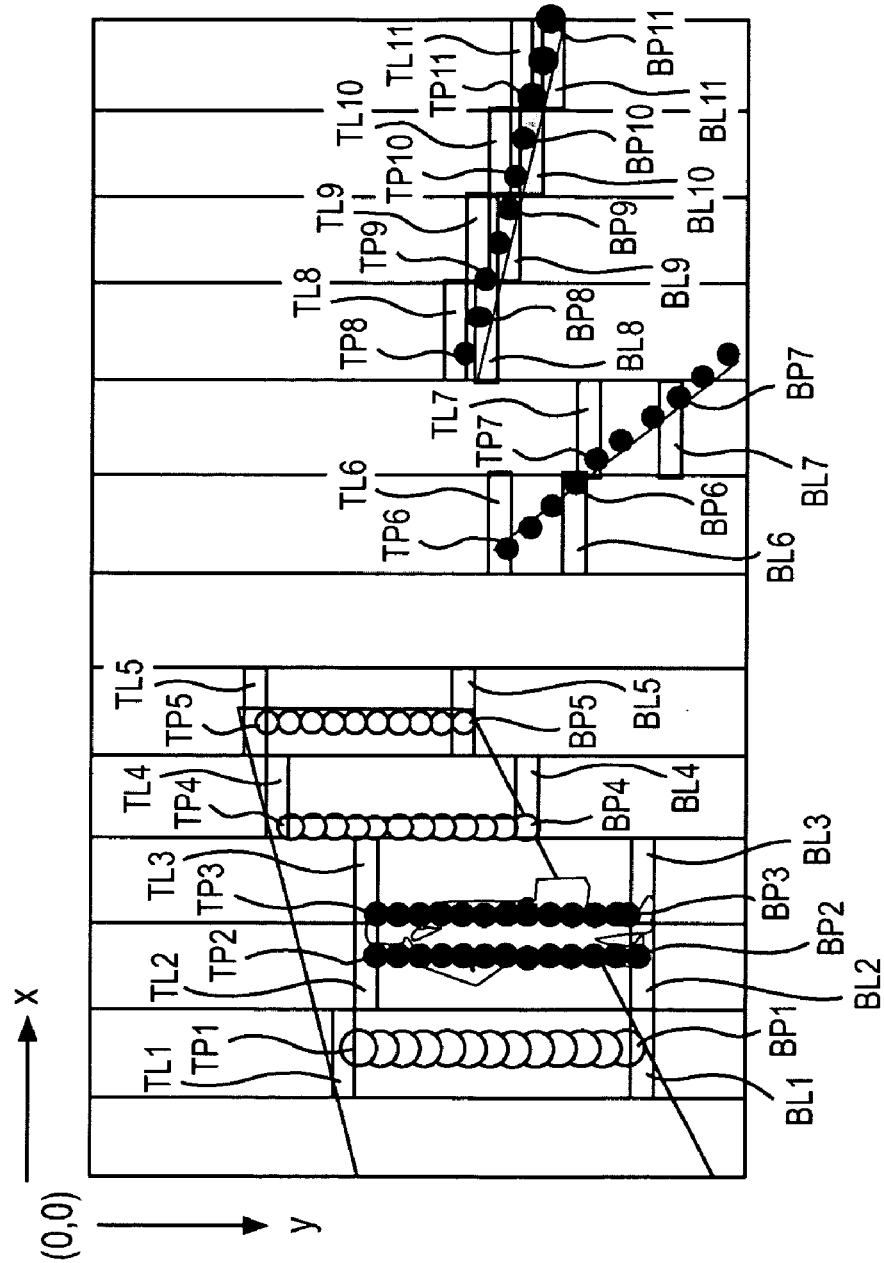
FIG. 6 is an explanatory view showing a situation in which object detecting regions are set on the velocity image, pixels having the same velocity as that of bottom points are grouped in each of the object detecting regions, and the positions of top points in the group are detected.

In order to extract a three-dimensional object from the calculated velocity image, the grouping unit 106 splits the velocity image into regions. FIG. 6 shows an example according to a preferred embodiment wherein the grouping unit 106 splits a velocity image into a plurality of vertically oriented strip-shaped regions.

Within each of the regions, pixels that have the same velocity and that are consecutively arranged in the image are grouped to detect a three-dimensional object. According to a preferred embodiment, each region of the image is progressively scanned, e.g., from the bottom to the top. When a pixel having a velocity is detected during a scan, the velocity of the pixel is compared with the velocity of an adjacent pixel that is detected next in the course of the scan. When the difference in velocity between the adjacent pixels is less than or equal to a threshold value T1, it is assumed that the pixels have the same velocity relative to the vehicle. Therefore, it is determined that the pixels represent the same object, and the pixels are accordingly grouped together.

Then, ends of the pixels grouped by the same velocity are detected. According to the example of a preferred embodiment, FIG. 6 illustrates that scans from bottom to top within each of the regions detect corresponding bottom points BP1 to BP1 and top points TP1 to TP11. The bottom points BP1 to BP11 and top points TP1 to TP11 serve as the centers of bottom levels BL1 to BL11 and top levels TL1 to TL11, respectively.

Next, the coordinate transforming unit 104 extracts three-dimensional position coordinates for the bottom points BP1 to BP11 and the top points TP1 to TP11. That is, the two-dimensional coordinates in the XY-plane for each of the bottom points BP1 to BP11 and the top points TP1 to TP11 are used to extract corresponding coordinates on a ZX plane having a specified area (hereinafter referred to as the specified ZX plane).

The x and y coordinates of the points TP1 to TP11 and BP1 to BP11 on the XY-plane are transformed into z and x' coordinates on the ZX plane according to expressions (1) and (2) as follows:

$$z = \frac{Ch}{\text{TAN}\left(Tr + \left(\left(y - \frac{Ih}{2}\right) \times PYr\right)\right)} \quad (1)$$

$$x' = x \times \text{TAN}\left(\left(z - \frac{Iw}{2}\right) \times PXr\right) \quad (2)$$

where x and y represents the coordinates of each point on the XY-plane, Ch (measured in meters) represents the height of the camera 101 from the road surface, Tr (measured in radians) represents the depression angle relative to the road surface of the camera 101, Ih (measured in pixels) represents the vertical size of the image, Iw (measured in pixels) represents the horizontal size of the image, PYr (measured in radians) represents the angular resolution for one pixel in the vertical direction, and PXr (measured in radians) represents the angular resolution for one pixel in the horizontal direction.

Thus, the coordinate transforming unit 104 transforms the coordinates in the XY-plane for the top points TP1 to TP11 and the bottom points BP1 to BP11 to transformed coordinates in the ZX-plane for the corresponding coordinate-transformed top points RT1 to RT11 and the coordinate-transformed bottom points RB1 to RB11, respectively. According to preferred embodiments of the present invention, the coordinate transforming unit 104 provides a means for transforming position coordinates of the pixels into three-dimensional position coordinates of a three-dimensional coordinate system.

Next, the object-attribute determining unit 107 determines in which region(s) of the specified ZX-plane that the coordinate-transformed top points RT1 to RT11 and the coordinate-transformed bottom points RB1 to RB11 belong, determines if an object is two-dimensional or three-dimensional, and determines positional information with regard to two-dimensional objects disposed on the road surface.

Figure 7:
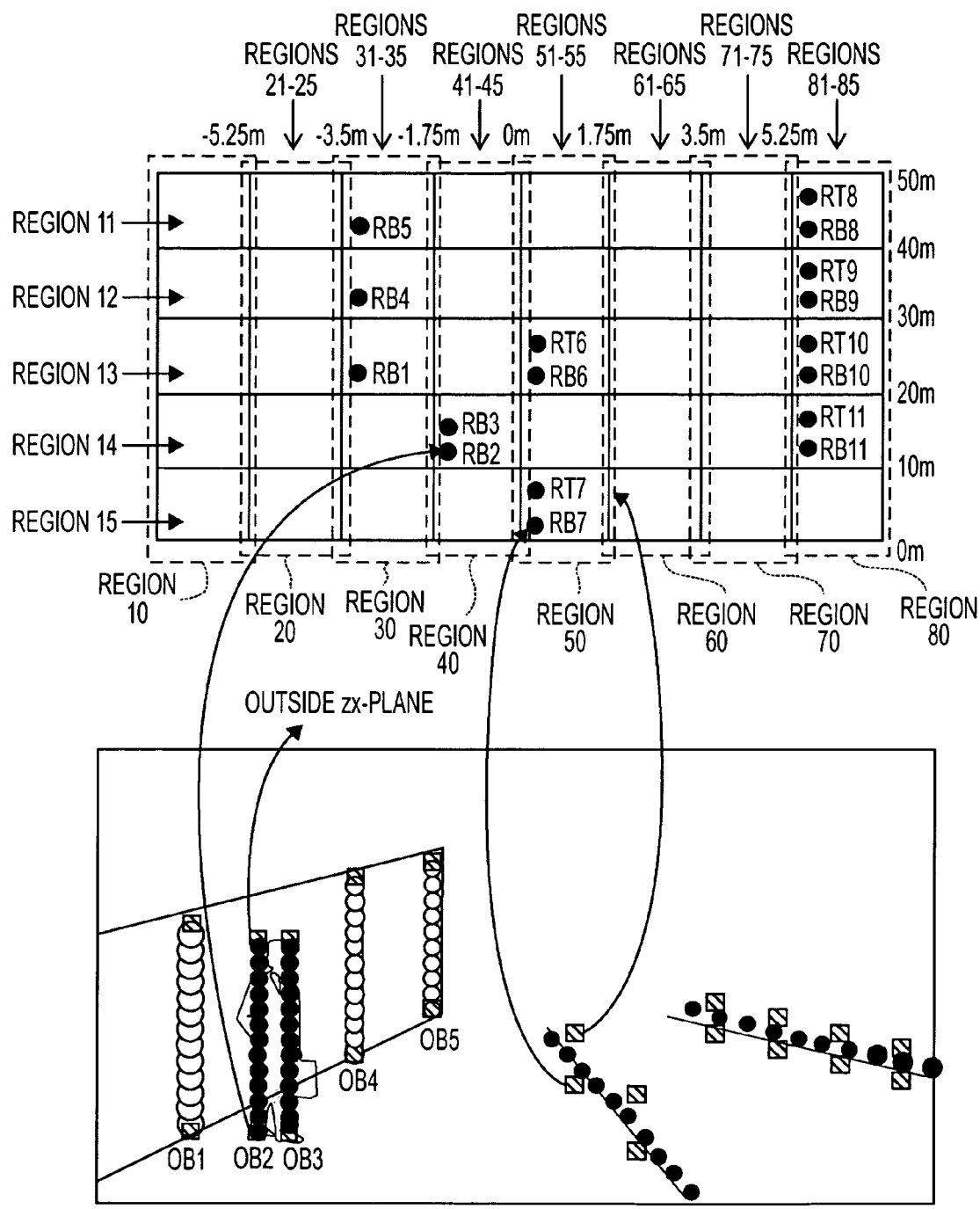
FIG. 7 is an explanatory view showing a situation in which the coordinates of the top points and bottom points detected on the velocity image are transformed into coordinates on the ZX-plane, and it is determined whether an object is two-dimensional or three-dimensional.

Referring additionally to FIG. 7, there is illustrated an example according to a preferred embodiment wherein the specified ZX-plane is split into a grid of regions. The portion of the ZX-plane that is "specified" is based on the area of interest ahead of the vehicle in which there is a desire to detect moving objects. For example, it has been determined that an area of interest may include ±5.25 meters along the Y-axis with respect to the optical axis LS and 50 meters ahead of the vehicle (i.e., along the Z-axis). Forty regions in an eight-by-five grid pattern are shown; however, it is envisioned that the grid pattern and/or the total number of regions may vary. In the example according to a preferred embodiment, the ZX-plane is split eight ways in the X-axis direction; e.g., −5.25 meters>x' (region 10), −5.25 meters≦x'<−3.5 meters (region 20), −3.5 meters≦x'<−1.75 meters (region 30), −1.75 meters≦x'<0 meters (region 40), 0 meters≦x'<1.75 meters (region 50), 1.75 meters≦x'<3.5 meters (region 60) 3.5 meters≦x'<5.25 meters (region 70), and 5.25 meters≦x' (region 80); and split five ways in the Z-axis direction; e.g., 0 meters≦z<10 meters, 10 meters≦z<20 meters, 20 meters≦z<30 meters, 30 meters≦z<40 meters, and 40 meters≦z<50 meters. As a result, regions 11 to 15 are defined in region 10, regions 21 to 25 are defined in region 20, regions 31 to 35 are defined in region 30, regions 41 to 45 are defined in region 40, regions 51 to 55 are defined in region 50, regions 61 to 65 are defined in region 60, regions 71 to 75 are defined in region 70, and regions 81 to 85 are defined in region 80. In FIG. 7, only regions 11 to 15 are indicated, with the indication of regions 21 to 85 omitted for the sake of clarity.

The distance ranges that correspond to the pixels in each region may vary from the particular numerical values selected in the example shown in FIG. 7. However, in order to avoid the influence of vertical movement, it is preferable that the distance ranges in the ZX-plane be set on the order of meters. That is, in the course of moving, the vehicle may also move vertically, e.g., due to undulations in the road surface. Accordingly, the image captured by the camera 101 may also move vertically, and thereby potentially change the region in the specified ZX-plane to which a coordinate-transformed point belongs. Splitting the pixels into distance ranges not less than about one-meter avoids the influence of vertical movement.

When a top point TP(n) and a bottom point BP(n) lie in the same strip-shaped region on the XY-plane, and the corresponding coordinate-transformed top point RT(n) and coordinate-transformed bottom point RB(n) lie in the same region on the specified ZX-plane, it is determined that the top point TP(n) and the bottom point BP(n) exist on the road surface and that they represent a two-dimensional object that is disposed on the road surface. On the other hand, when the coordinate-transformed top point RT(n) lies outside the specified ZX-plane and the corresponding coordinate-transformed bottom point RB(n) lies on the specified ZX-plane, it is determined that only the corresponding bottom point BP(n) lies on the road surface, i.e., the corresponding top point TP(n) does not lie on the road surface, and that the points TP(n) and BP(n) represent a three-dimensional object. In order to detect lane borders, count values are set to a numerical "one" for only those counters in regions in which the coordinate-transformed bottom points exist, and a positional information distribution of the bottom points is calculated.

According to the example shown in FIG. 7, the coordinate-transformed points RT1 to RT5, which correspond to the top points TP1 to TP5, respectively, are projected outside the specified ZX-plane shown in FIG. 7. Therefore, it is determined that groups including the top points TP1 to TP5 are three-dimensional objects, and that edges including the top points TP1 to TP5 are three-dimensional objects OB1 to OB5 on the XY-plane. Since the coordinate-transformed top points RT6 to RT11, which correspond to the top points TP6 to TP11, exist respectively in the same regions as those of the coordinate-transformed bottom points RB6 to RB11, which correspond to the bottom points BP6 to BP11, it is determined that groups including the top points TP6 to TP11 are objects lying on the road surface.

In order to detect lane borders, the count values of the counters in the regions that include the coordinate-transformed bottom points RB1 to RB11, which correspond to the bottom points BP1 to BP11, are increased by one. Regions where there is a high possibility that a lane border may exist are extracted from the obtained positional distribution of the coordinate-transformed bottom points. That is, when count values exist in a plurality of Z-axis regions in the same X-axis region of the obtained positional distribution, it can be assumed that a lane border linearly extends along and ahead of the vehicle. The regions in which the count values exist are extracted as lane border regions.

Figure 8:
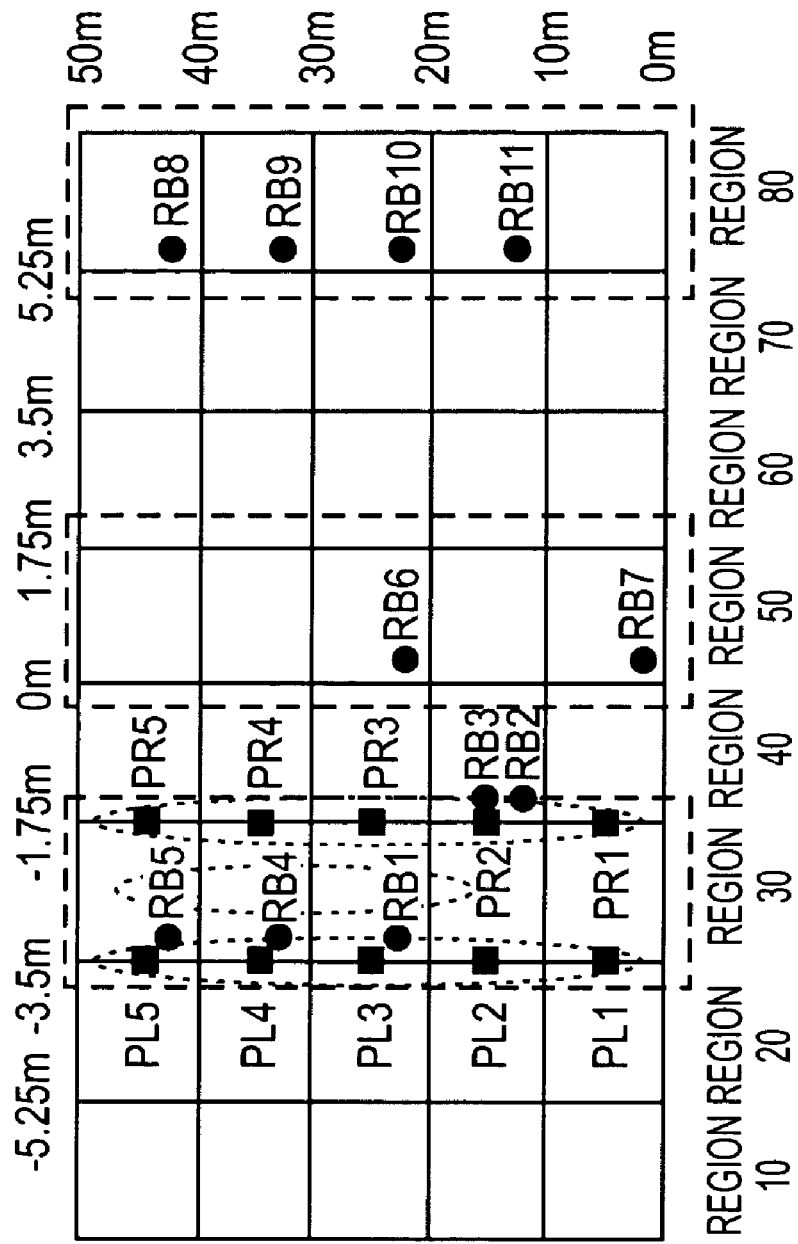
FIG. 8 is an explanatory view showing how to detect lane borders according to a positional distribution on the ZX-plane of coordinate-transformed bottom points.

Referring additionally to FIG. 8, there is illustrated an example according to a preferred embodiment wherein the obtained positional information distribution of the bottom points is evaluated According to the example shown in FIG. 8, count values for the coordinate-transformed bottom points RB1, RB4 and RB5 exist in a plurality of Z-axis regions in X-axis region 30. Similarly, count values for the coordinate-transformed bottom points RB6 and RB7 exist in a plurality of Z-axis regions in X-axis region 50, and count values for the coordinate-transformed bottom points RB8, RB9, RB10 and RB11 exist in a plurality of Z-axis regions in X-axis region 80. Thus, these regions are extracted as there is a high possibility of being lane border regions.

In contrast, coordinate-transformed bottom points do not exist anywhere in the X-axis regions 10, 20 60 and 70, and the count values for the coordinate-transformed bottom points RB1 and RB3 exist in only one Z-axis region in the X-axis region 40. Thus, these regions are not extracted as possible lane border regions.

Regression analysis is used to determine whether a line representing a lane border exists in the extracted regions. The inclination of a line passing through a plurality of bottom points is calculated by regression analysis on the coordinates in the XY coordinate system based on the corresponding coordinate-transformed bottom points. For example, in the X-axis region 30, an inclination $A_3$ of a line passing through the bottom points BP1, BP4 and BP5 is calculated by regression analysis on the coordinates in the XY coordinate system, with the selection of the bottom points BP1, BP4 and BP5 being based on the positional distribution of the corresponding coordinate-transformed bottom points RB1, RB4 and RB5. Similarly, the inclination $A_5$ of a line passing through bottom points BP6 and BP7, and the inclination $A_8$ of a line passing through bottom points BP8 to BP11 are also calculated.

When the calculated inclination A(n) is within a predetermined range, it is determined that a line L(n) representing a lane border exists in the extracted region. That is, when an inclination A(n) of a line calculated for the bottom points is within an inclination range defined by a line inclination $T(n)_{min}$ and a line inclination $T(n)_{max}$, it is determined that a lane border L(n) exists in the extracted region.

Figure 9:
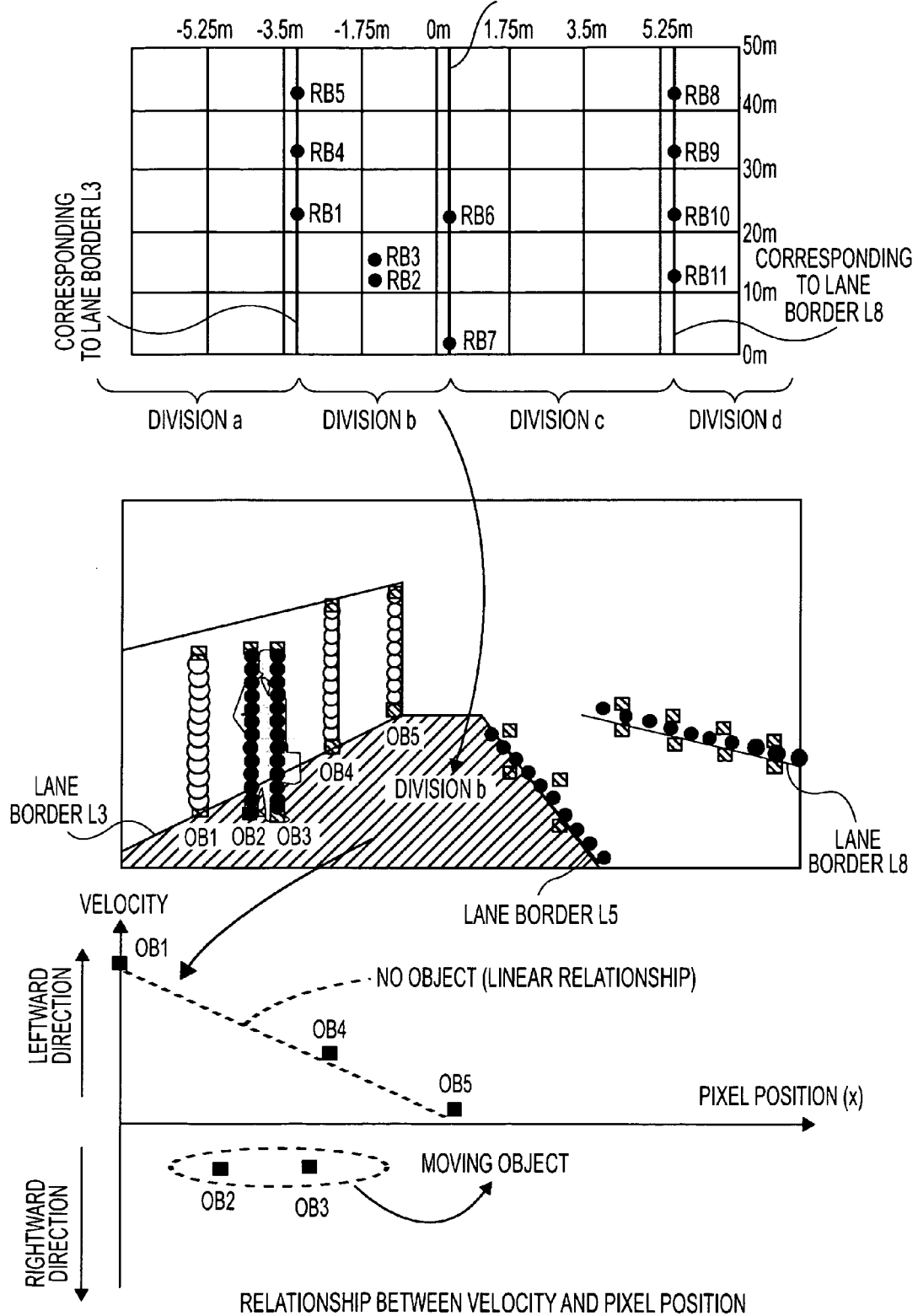
FIG. 9 is an explanatory view showing how to detect a moving object on the basis of the relationship between the horizontal position and velocity of a three-dimensional object detected in a division defined by the detected lane borders.

Referring again to the X-axis region 30 in the example illustrated in FIG. 8, the line inclination $T3_{min}$ is calculated by regression analysis of coordinates in the XY coordinate system that correspond to points PL1 to PL5 in the specified ZX-plane. The coordinates of the points PL1 to PL5 are the left end of the X-axis region that includes the coordinate-transformed bottom points and, typically, the center of each of the corresponding Z-axis regions. Similarly, the line inclination $T3_{max}$ is calculated by regression analysis of coordinates in the XY coordinate system that correspond to points PR1 to PR5 in the specified ZX plane. The coordinates of the points PR1 to PR5 are the right end of the X-axis region that includes the coordinate-transformed bottom points and, typically, the center of each of the corresponding Z-axis regions. Thus, if the line on the XY plane that connects the bottom points BP1, BP4 and BP5 is a lane border, the inclination A3 will lie within a range between $T3_{min}$ and $T3_{max}$. The inclination $T3_{min}$ is calculated by regression analysis on coordinates in the XY coordinate system that correspond to point PL1 (having x'coordinate −3.5, and z coordinate 5), point PL2 (−3.5, 15), point PL3 (−3.5, 25), point PL4 (−3.5, 35), and point PL5 (−3.5, 45). And the inclination $T3_{max}$ is calculated by regression analysis on coordinates in the XY coordinate system that correspond to point PR1 (−1.75, 5), point PR2 (−1.75, 15), point PR3 (−1.75, 25), point PR4 (−1.75, 35), and point PR5 (−1.75, 45). Referring additionally to FIG. 9, it is therefore determined that the bottom points BP1, BP4 and BP5 on the XY plane are connected by lane border L3. Similarly, it is determined with respect to the coordinate-transformed bottom points RB6 and RB7 in region 50 that the bottom points BP6 and BP7 on the XY plane are connected by lane border L5, and with respect to the coordinate-transformed bottom points RB8 to RB11 in region 80 that the bottom points BP8 to BP11 on the XY plane are connected by lane border L8.

FIG. 9 illustrates an example according to a preferred embodiment wherein divisions are defined by the lane borders, and a graph is calculated which shows the relationship between the horizontal position and the velocity of a detected three-dimensional object in an image. According to the example, the image shows a three-dimensional object, e.g., a background such as a wall, which exists to the left side of the center of the image. As it is shown in the two-dimensional image, the wall appears to be spaced further from the vehicle in the foreground of the image, i.e., proximate the front of the vehicle, with the projection of the wall toward the center of the image making it appear that the wall gets closer to the vehicle further in front to the vehicle. Correspondingly, the velocity information for the wall shows that the velocities of the pixels that represent the wall decrease from left to right (recalling that a decrease in the size of the circles represents a decreases in velocity, and that leftward velocity relative to the vehicle is represented by white circles.

Accordingly, FIG. 9 also shows a graph for division "b" (as will be further described hereinafter) in which the horizontal axis represents the x coordinate of object pixels that are shown in the image (the origin of both the image and the graph are set at the left), and in which the vertical axis represents pixel velocity (velocity in the leftward direction is selected as positive and is shown above the horizontal axis, and velocity in the rightward direction is selected as negative and is shown below the horizontal axis). The relationship between the velocity and the x coordinate of a stationary object, such as the wall, is shown in FIG. 9 by a dashed line with a negative slope.

If a relationship between the velocity and the x coordinate is not shown by a negative sloping line, then there is a possibility that a non-stationary object, i.e., a moving object, exists in the division. As the graph in FIG. 9 shows, when pixels of a second object, e.g., the pedestrian, have a velocity that is opposite to the velocity of the background (in this example, the pedestrian has a rightward velocity as opposed to the leftward velocity of the background), it is determined that there exists an object moving in an opposite direction to that of the background. Further, when the pixels of the second object have a velocity higher than that of the background, even if they are moving in the same direction, it is determined that a moving object exists.

In the example according to a preferred embodiment, divisions are set on the basis of the lane borders L3, L5 and L8 that were detected in the X-axis regions 30, 50 and 80, respectively. More specifically, with reference to the top portion of FIG. 9, division "a" is defined as an area on the left side of the lane border L3, which includes the X-axis regions 10 and 20, and a left portion of the region 30, division "b" is defined as an area between the lane borders L3 and L5, which includes a right portion of the X-axis region 30, the X-axis region 40, and a left portion of the X-axis region 50, a division "c" is defined as an area between the lane borders L5 and L8, which includes a right portion of the X-axis region 50, the X-axis regions 60 and 70, and a left portion of the X-axis region 80, and division "d" is defined as an area on the right side of the lane border L8, which includes a right portion of the region 80. From the relationship between the horizontal positions and velocities of three-dimensional objects OB1 to OB5 existing in division b, it is determined that the objects OB1, OB4, and OB5 represent a three-dimensional stationary object, e.g., the background wall, and that the objects OB2 and OB3 represent a rightward moving object, e.g., the pedestrian.

As for a three-dimensional object existing on the right side of the image, a similar graph may be plotted that shows the relationship between the pixel velocity (again, the velocity in the leftward direction would be positive, and the velocity in the rightward direction would be negative) and the x coordinate of the pixel in the image (in this case, the origin of the image would be set at the right). In an evaluation similar to that for the left side of the image, if a relationship between the velocity and the x coordinate is shown by a line with a positive slope, it is determined that the possibility of the presence of a three-dimensional object in the division is high. When a velocity in the direction opposite to that of the background is detected, an object moving in the direction opposite to that of the background, e.g., an object moving from right to left in the image, can be detected.

By utilizing vehicle behavior (e.g., running direction of the vehicle), it is possible to determine whether moving objects should be separately detected on the right and left sides of the captured image, as described above, or whether moving objects can be detected from the entire captured image. For example, when the vehicle is steered to the right, only a velocity in the leftward direction is detected in an area corresponding to the background ahead of the vehicle. Therefore, moving objects can be detected together from the entire captured image, without being separately detected on the right and left sides of the image. This also applies when the vehicle is steered to the left.

Thus, the determination of whether a three-dimensional object is moving is performed by comparing the horizontal position and velocity of the three-dimensional object relative to the background to the three-dimensional object. When a three-dimensional object, such as an external wall, corresponding to the background cannot be extracted, it is not possible according to the above described methodology to detect movement of a three-dimensional object such as the pedestrian. However, as will be described hereinafter, the determination of a moving object can be made by an alternative methodology based on changes in velocity of the object when the object is determined to be three-dimensional in at least two detecting operations.

According to preferred embodiments of the present invention, the object-attribute determining unit 107 provides a means for determining whether the feature is a moving object.

Figure 10:
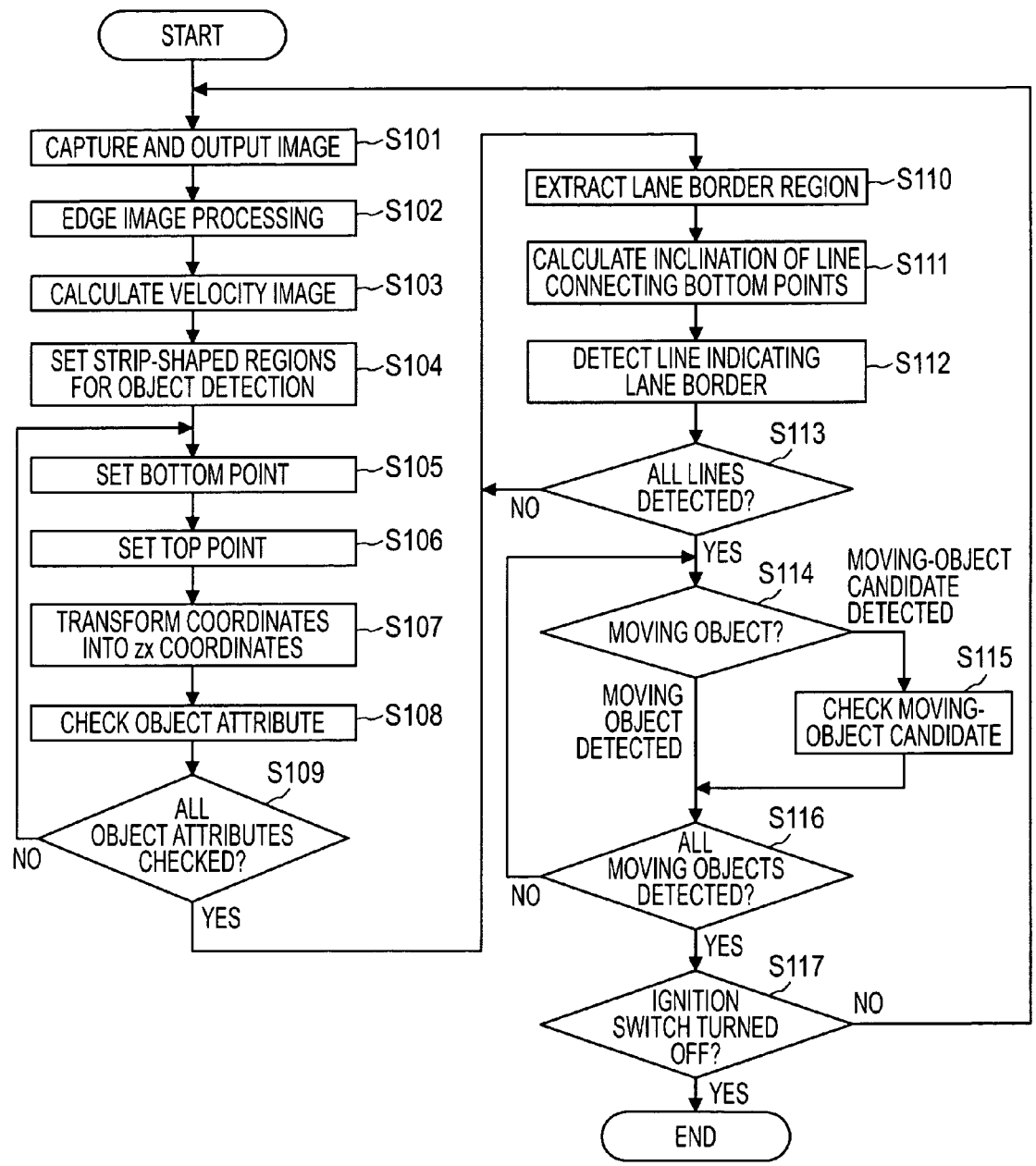
FIG. 10 is a flowchart showing a procedure performed by the object detecting system of the first embodiment.

FIG. 10 is a flowchart showing a procedure performed by the object detecting system 10 according to a preferred embodiment. This procedure is carried out as a program that is started in response to turning ON an ignition switch (not shown).

In a step S101, an image of a scene ahead of a vehicle is captured by the camera 101, stored in the temporary image storage unit 102, and is output to the feature extracting unit 103 on a predetermined cycle.

In a step S102, the feature extracting unit 103 subjects the image to edge extraction and normalization wherein outlines of objects that exist in the captured image are extracted as edges, which are then normalized.

In a step S103, the motion-information calculating unit 105 calculates the velocities of the edges, and calculates a velocity image that expresses the calculated velocities at a predetermined number of levels.

In a step S104, strip-shaped regions for object detection are set on the velocity image that is calculated by the motion-information calculating unit 105.

In a step S105, the grouping unit 106 checks the image from bottom to top in order to determine which, if any, of the strip-shaped regions have at least one pixel with a velocity. When there are pixels that have velocities, the grouping unit 106 determines the pixels that represent the same object and groups together those pixels.

In a step S106, the center coordinates of the uppermost pixel are set as a top point and the center coordinates of the lowermost pixel are set as a bottom point for each group in each strip-shaped region.

In a step S107, the coordinate transforming unit 104 transforms the coordinates on the XY plane of the detected top and bottom points into coordinates on the specified ZX plane by using the above expressions (1) and (2).

In a step S108, the object-attribute determining unit 107 determines which of a plurality of regions defined on the specified ZX plane include the coordinate-transformed top and bottom points that belong to the same group. When both the coordinate-transformed top and bottom points lie in the same region on the specified ZX plane, it is determined that an object including the top and bottom points is a two-dimensional object. When only the coordinate-transformed bottom point lies on the specified ZX plane, it is determined that an object including the top and bottom points is a three-dimensional object. Further, the count value of the counters in the regions where the coordinate-transformed bottom points lie are increased to a numerical "one."

In a step S109, the object-attribute determining unit 107 determines whether all the detected coordinate-transformed top and bottom points have been subjected to the determination (hereinafter, referred to as object-attribute determination) for determining whether each of the objects including the top and bottom points is a two-dimensional object or a three-dimensional object. When the object-attribute determination has been performed for all of the detected points, a step S110 is performed. In contrast, when the determination has not yet been performed for all the detected points, the step S105 is performed again.

In the step S110, on the basis of the positional distribution of coordinate-transformed bottom points on the ZX plane, the object-attribute determining unit 107 extracts a plurality of Z-axis regions that are in the same X-axis region and in which there are count values. There is a high possibility that a lane border exists in the extracted regions.

In a step S111, the object-attribute determining unit 107 performs regression analysis on the bottom points in the XY coordinate system that correspond to the coordinate-transformed bottom points lying in the extracted regions, thereby calculating the inclination of a line connecting the bottom points.

In a step S112, when the inclination of the line calculated in the step S111 is within a range of inclination in the XY coordinate system, the object-attribute determining unit 107 determines that a line representing a lane border exists in the extracted regions, and the line calculated in the step S111 is detected as the line representing the lane border. Limits on the range of inclination are calculated by regression analysis based on coordinates in the XY coordinate system that correspond to points on lines at the left and right sides of the X-axis region that includes the coordinate-transformed bottom points lying in the extracted regions.

In a step S113, the object-attribute determining unit 107 determines whether all lines serving as lane borders have been detected in the extracted regions. When all lines have been detected, a step S114 is performed. In contrast, when all lines have not been detected, the step S110 is performed again.

In the step S114, the object-attribute determining unit 107 calculates the relationship between the velocity and the x coordinate of the pixels for the three-dimensional objects existing in each of the divisions defined by the lane borders. When a three-dimensional object having a velocity in the direction opposite that of the background is detected, it is determined that a moving object approaching the vehicle exists, and a step S116 is performed. When there is no object having a velocity that is opposite to that of the background, it is determined that there is a possibility that a moving-object candidate exists, and a step S115 is performed.

In the step S115, the object-attribute determining unit 107 determines whether the moving-object candidate is a moving object. If the moving-object candidate also existed in the same division in a previous detecting operation, the velocity of the candidate in the previous detecting operation is compared with the velocity in the present detecting operation. When the moving-object candidate is a stationary object, it approaches the vehicle as the vehicle advances. Consequently, the velocity of the pixels corresponding to the moving-object candidate increase. For this reason, when the velocity of the coordinate-transformed point of the bottom point is higher than in the previous operation, it is determined that there is no moving object. When the velocity of the coordinate-transformed point is not higher, it is determined that there is a moving object.

In the step S116, it is determined whether detection of a moving object has been performed in all the divisions defined by the lane borders. When all moving objects have been detected, a step S117 is performed. In contrast, if all moving objects have not been detected, the step S114 is performed again.

In the step S117, it is determined whether the ignition switch of the vehicle is turned OFF. When the ignition switch is not turned off, the step S101 is performed again. In contrast, when the ignition switch is turned OFF, the procedure is completed.

Object detecting systems according to the above-described first set of preferred embodiments provide a number of features, some of which will now be described.

The object detecting system includes the controller 100 and an image capturing section, e.g., the camera 101, for capturing an image of a scene ahead of the vehicle. The controller 100 includes the feature extracting unit 103 for extracting a feature from the image captured by the camera 101, the motion-information calculating unit 105 for calculating feature velocity information about pixels representing the feature, the coordinate transforming unit 104 for transforming the position coordinates of the pixels into three-dimensional position coordinates on a three-dimensional coordinate system, and the object-attribute determining unit 107 for determining, on the basis of the three-dimensional position coordinates of the pixels and the feature velocity information, whether the feature is a moving object.

According to this combination, it is possible to determine, on the basis of the velocity and the position coordinates of the feature in the image, whether the feature extracted from the image captured by the camera 101 is a moving object.

The object detecting system further includes the grouping unit 106 for grouping the pixels when pixels that are adjacent in the vertical direction of the image also have velocity differences that are within a predetermined range. The object-attribute determining unit 107 performs the above-described determination on the basis of the three-dimensional position coordinates of the uppermost pixel and the lowermost pixel of the pixels grouped by the grouping unit 106.

According to this further combination, object detecting regions are set on a velocity image, which is calculated from the image captured by the camera 101, and pixels that are adjacent in the vertical direction of the image and that have velocity differences within the predetermined range are grouped together in each of the regions. The uppermost pixel (top point) and the lowermost pixel (bottom point) of the grouped pixels are detected. The coordinates of the uppermost and lowermost points are transformed into coordinates on a specified ZX plane. By using the transformed position coordinates, determination of moving objects can be performed efficiently.

The object-attribute determining unit 107 determines that the feature is a two-dimensional object when the uppermost pixel and the lowermost pixel lie in a common one of the predetermined of regions on the specified ZX plane, and determines that the feature is a three-dimensional object when the uppermost pixel lies outside the specified ZX plane and the lowermost pixel lies in any of the regions of the specified ZX plane.

Accordingly, the position coordinates of the uppermost pixel (top point) and the lowermost pixel (bottom point) are transformed into coordinates on the ZX plane by using camera parameters. For two-dimensional objects such as painted lines or other marker that lie on the road surface, both the top and bottom points are projected by coordinate transformation on the specified ZX plane. In contrast, for three-dimensional objects, only the bottom point that lies on the road surface is projected by coordinate transformation on the specified ZX plane; whereas the projection by coordinate transformation of the top point is off the specified ZX plane. Thus, even when the camera 101 is monocular, it is possible to discriminate between two-dimensional and three-dimensional objects according to the relative placement in one or more regions of transformed coordinates corresponding to the top and bottom points.

Further, the object-attribute determining unit 107 may perform a moving-object determination on each of the three-dimensional objects for determining, on the basis of velocity information about the object and the position coordinates of the object in the image, whether the object is a moving object.

Accordingly, it is determined on the basis of a relationship between the horizontal position and velocity of the detected three-dimensional object in the image, whether a detected three-dimensional object is a moving object. A three-dimensional object that provides background in the image moves away from the vehicle in a lateral direction and the velocity of the object in the image decreases. Therefore, the horizontal position and velocity of the object in the image are generally proportional to each other. In contrast, the horizontal position and velocity are not proportional for a three-dimensional object in the image that exists in front of the background. Therefore, it is possible to estimate the motion of the background without estimating the motion of the vehicle and calculating the distance to the object, and to discriminate an object, which moves in a manner different from that of the background, as a moving object distinct from the background. Consequently, the moving object can be easily detected at high speed.

Further, the object-attribute determining unit 107 may also detect lane borders that serve as borders for a lane in which the vehicle is moving. Lane borders are determined on the basis of position coordinates in the three-dimensional coordinate system for the lowermost of the pixels in the vertical direction of the image. The object-attribute determining unit 107 performs the moving-object determination in each of several divisions that are defined by the lane borders.

Accordingly, the lane borders can be detected from the positions of the coordinate-transformed bottom points, and the moving-object determination is performed in each of the divisions that are defined by the lane borders. Therefore, the moving-object determination can be efficiently performed even for a complicated image.

Further, it is taken that each object in the captured image includes an object edge. Accordingly, the feature extracting unit 103 detects an edge of the objects in the image captured by the camera 101. Basic image processing techniques may be used to detect the object edges.

Object detecting methods according to the above-described first set of preferred embodiments provide a number of features, some of which will now be described.

The object detecting method includes capturing an image of a scene ahead of a vehicle, extracting a feature from the captured image, calculating velocity information about pixels representing the extracted feature, transforming position coordinates of the pixels in the image into three-dimensional position coordinates in a three-dimensional coordinate system, and determining, on the basis of the position three-dimensional coordinates of the pixels and the velocity information about the pixels, whether the feature is a moving object.

According to this combination, it is possible to determine on the basis of the velocity information and the position coordinates of the feature in the image whether the feature extracted from the captured image is a moving object.

The object detecting method further includes grouping together adjacent pixels in the vertical direction of the image and have velocity differences within a predetermined range. The determination of the moving object is performed on the basis of the three-dimensional position coordinates of the uppermost pixel and the lowermost pixel of the grouped pixels.

Accordingly, object detecting regions are set on a velocity image calculated from the captured image. In each of the regions, vertically adjacent pixels of the image that have velocity differences within a predetermined range are grouped together, and the uppermost pixel (top point) and the lowermost pixel (bottom point) of the grouped pixels are detected. The coordinates of the uppermost pixel and the lowermost pixel are transformed into coordinates on a ZX plane, and determination of the moving object is efficiently performed according to the transformed position coordinates.

An object is determined to be two-dimensional when the uppermost pixel and the lowermost pixel lie in the same one of a predetermined number of regions into which a specified ZX plane is split. An object is determined to be three-dimensional when the uppermost pixel lies outside the specified ZX plane and the lowermost pixel lies in any of the regions on the specified ZX plane.

Accordingly, position coordinates of the uppermost pixel (top point) and the lowermost pixel (bottom point) are transformed into coordinates on the ZX plane by using camera parameters. Both the top and bottom points of a two-dimensional object, such as a white line or another road marker lying on the road surface exist on the road surface, are projected on the specified ZX plane by the coordinate transformation. In contrast, only the bottom point of a three-dimensional object lies on the road surface; whereas the top point thereof does not lie on the road surface. Therefore, only the bottom point is projected on the specified ZX plane, and projection of the top point deviates from the specified ZX plane. Thus, even when a monocular image is captured, it is possible to discriminate between two- and three-dimensional objects according to the relative placement in one or more regions of transformed coordinates corresponding to the top and bottom points.

Further, the moving-object determination determines whether each of a plurality of three-dimensional objects is a moving object on the basis of velocity information about the object and the position coordinates of the object in the image.

Accordingly, determination of the moving object is performed on the basis of a relationship between the horizontal position and velocity of a detected three-dimensional object in the image. As a three-dimensional background object moves away from the vehicle, it moves in the lateral direction in the image, and the velocity thereof in the image decreases. Therefore, the horizontal position is proportional to the velocity in the image. In contrast, the horizontal position and the velocity in the image are not proportional for an object that exists in front of the three-dimensional background object. Therefore, it is possible to estimate the motion of the background without estimating the motion of the vehicle and calculating the distance to the object, and to discriminate an object, which moves in a manner different from that of the background, as an object moving relative to the background. Consequently, the moving object can be easily detected at high speed.

Further, lane borders in which the vehicle is intended to move may be detected on the basis of position coordinates on the ZX plane for the vertically lowermost pixel of a group in the image. The moving-object determination is performed in each of divisions defined by the lane borders.

Accordingly, the lane borders may be detected from the coordinate-transformed bottom points, and the moving-object determination is performed in each of the divisions defined by the lane borders. Therefore, the moving-object determination can be efficiently performed even for a complicated background.

Further, it is taken that each object in the captured image includes an object edge. Accordingly, an object edge is detected from the captured image. Basic image processing techniques may be used to detect the object edges.

Second Set of Preferred Embodiments

A two-dimensional object and a three-dimensional object are detected even when the pixels that correspond to the three-dimensional object or to a moving object cannot be grouped on the basis of velocity information, for example, because of the results of edge detection.

Figure 11:
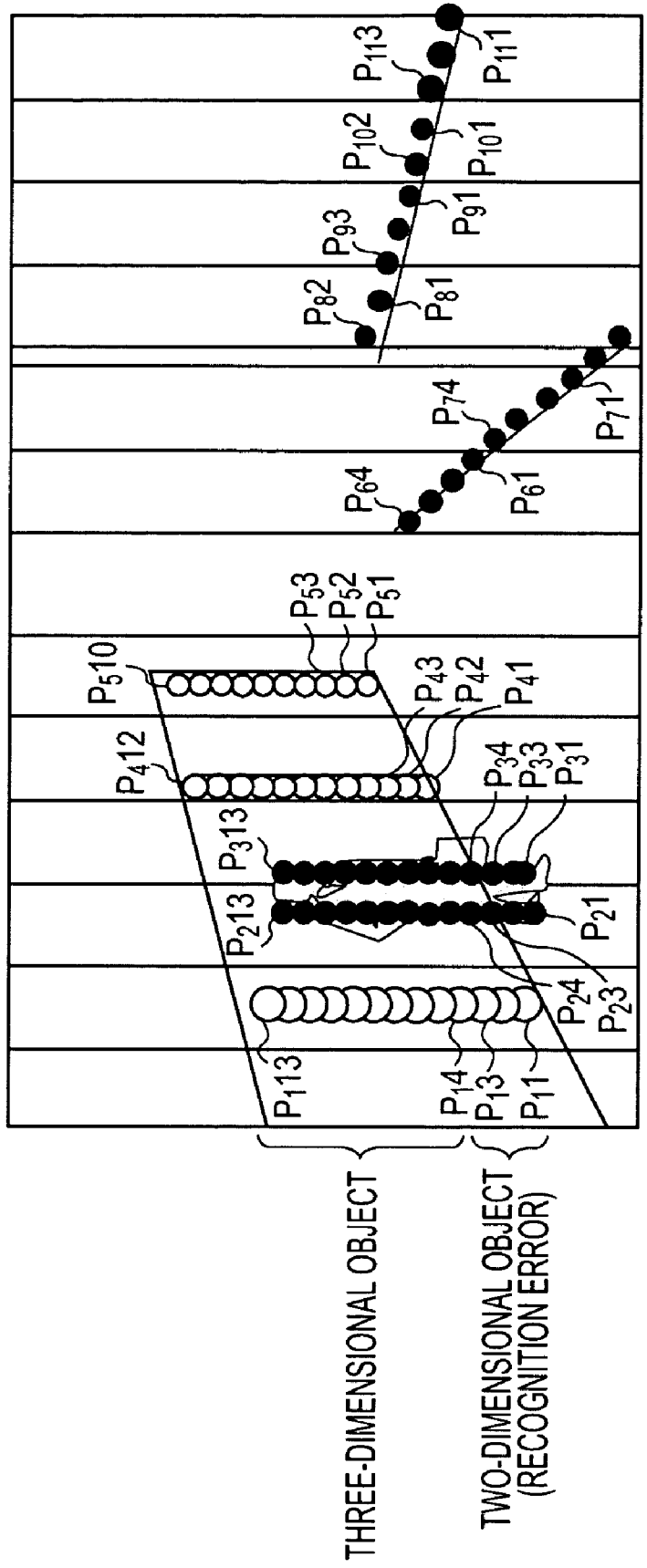
FIG. 11 is an explanatory view showing a situation in which object detecting regions are set on a velocity image, and coordinates of pixels having velocities are transformed into coordinates on the ZX-plane in order to determine whether the pixels are two-dimensional object candidate points or three-dimensional object candidate points.

FIG. 11 illustrates an example of grouping according to a preferred embodiment. Of the points $P_1 1$ to $P_1 13$, points $P_4 1$ to $P_4 12$ and points $P_5 1$ to $P_5 10$ that are detected on an external wall, points $P_1 1$ to $P_1 3$, points $P_1 4$ to $P_1 13$, points $P_4 1$ and $P_4 2$, points $P_4 3$ to $P_4 12$, points $P_5 1$ and $P_5 2$, and points $P_5 3$ to $P_5 10$ are separately grouped. Similarly, of the points $P_2 1$ to $P_2 13$ and points $P_3 1$ to $P_3 13$ that are detected on a pedestrian, points $P_2 1$ to $P_2 3$, points $P_2 4$ to $P_2 13$, points $P_3 1$ to $P_3 3$, and points $P_3 4$ to $P_3 13$ are separately grouped.

Similarly to the first set of preferred embodiments, the second set of preferred embodiments will also be described with reference to FIG. 1 serving as the block diagram, FIG. 2 showing the installation example of the camera 101 in the vehicle, FIG. 3 showing an image of a scene ahead of the vehicle captured by the camera 101, FIG. 4 explaining normalization of an edge, and FIG. 5 showing a velocity image. Descriptions of these figures are not repeated. Further, similar to the first set of preferred embodiments, the second set of preferred embodiments adopts the method shown in FIGS. 8 and 9 for detecting lane borders on the basis of bottom points and detecting a moving object from the relationship between the horizontal position and velocity of a three-dimensional object in each division that is defined by the detected lane borders. Therefore, a description of the method is not repeated.

FIG. 11 illustrates an example according to a preferred embodiment wherein regions for object detection are set on a calculated velocity image. That is, the velocity image shown in FIG. 11 is split into a plurality of strip-shaped regions. In the example according to a preferred embodiment, pixels having velocities are detected by scanning the image from bottom to top in each of the regions. The coordinates of the detected pixels are transformed to coordinates on the ZX plane according to expressions (1) and (2) described above, and it is determined whether the transformed coordinates lie in a specified ZX plane, similar to the example with respect to FIG. 7. When the transformed coordinates lie in the specified ZX plane, it is determined that the pixels are two-dimensional object candidate points. In contrast, when the transformed coordinates do not lie in the specified ZX plane, it is determined that the pixels are three-dimensional object candidate points. Since the specified ZX plane is the same as that in the examples according to the first set of embodiments, a description thereof is not repeated. Referring again to the example shown in FIG. 11, points $P_1 1$ to $P_1 3$ lie in the same region on the specified ZX plane, and are judged as being two-dimensional object candidate points. Since points $P_1 4$ to $P_1 13$ do not lie in the specified ZX plane, they are judged as being three-dimensional object candidate points. Similarly, points $P_2 1$ to $P_2 3$, $P_3 1$ to $P_3 3$, $P_4 1$, $P_4 2$, $P_5 1$, $P_5 2$, $P_6 1$ to $P_6 4$, $P_7 1$ to $P_7 4$, $P_8 1$, $P_8 2$, $P_9 1$ to $P_9 3$, $P_{10} 1$, $P_{10} 2$, and $P_{11} 1$ to $P_{11} 3$ are judged as being two-dimensional object candidate points, and points $P_2 4$ to $P_2 13$, $P_3 4$ to $P_3 13$, $P_4 3$ to $P_4 12$, and $P_5 3$ to $P_5 10$ are judged as being three-dimensional object candidate points.

Figure 12:
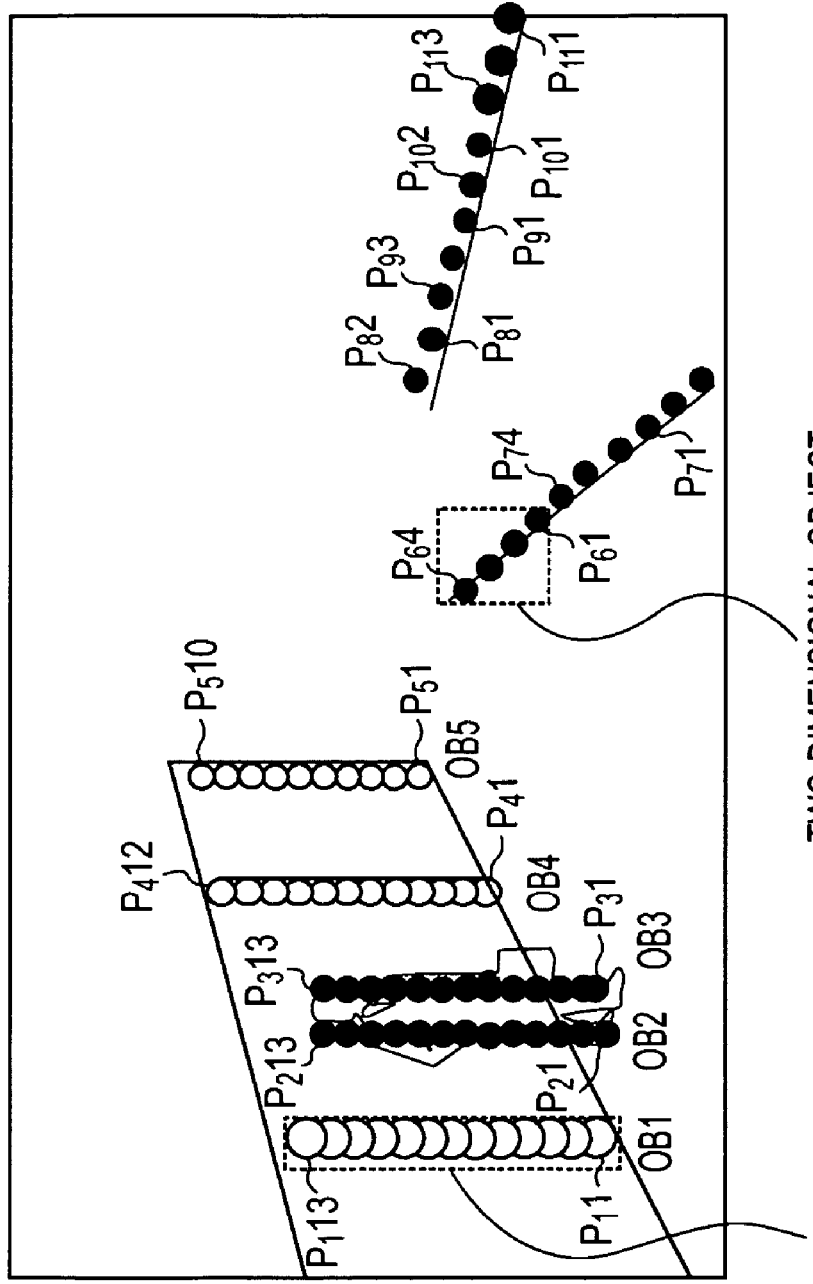
FIG. 12 is an explanatory view showing how to detect a three-dimensional object on the basis of the arrangement of the detected two-dimensional object candidate points and three-dimensional object candidate points.

Subsequently, it is determined on the basis of the detected two-dimensional object candidate points and the three-dimensional object candidate points whether a three-dimensional object exists. That is, when the points judged as being the two-dimensional object candidate points and the points judged as being the three-dimensional object candidate points are consecutively arranged in the vertical direction, it can be assumed that a portion of a three-dimensional object adjacent to the road surface was erroneously judged as being two-dimensional object candidate points. Therefore, it is determined that an object that is represented by both two-dimensional object candidate points and three-dimensional object candidate points is actually a three-dimensional object, as shown in FIG. 12. For example, since the two-dimensional object candidate points $P_1 1$ to $P_1 3$ and the three-dimensional object candidate points $P_1 4$ to $P_1 13$ are consecutively arranged in the vertical direction, it is determined that $P_1 1$ to $P_1 13$ represent a three-dimensional object OB1. Similarly, it is determined that the points $P_2 1$ to $P_2 13$, the points $P_3 1$ to $P_3 13$, the points $P_4 1$ to $P_4 12$, and the points $P_5 1$ to $P_5 10$ represent three-dimensional objects OB2, OB3, OB4, and OB5, respectively.

Further, as shown in FIG. 12, bottom points are extracted from the points judged as being combinations of two-dimensional and three-dimensional objects, and count values of counters are set to a numerical "one" for only those counters in the regions of the ZX-plane in which the coordinate-transformed bottom points exist, in a manner similar to that in the first set of embodiments, and a positional distribution of the bottom points is calculated. For example, $P_1 1$, $P_2 1$, $P_3 1$, $P_4 1$, $P_5 1$, $P_6 1$, $P_7 1$, $P_8 1$, $P_9 1$, $P_{10} 1$ and $P_{11} 1$ are as bottom points, and count values of counters in the regions including the corresponding coordinate-transformed bottom points RB1 and RB11 are set to a numerical "one." By performing subsequent operations similar to those described in connection with the examples according to the first set of preferred embodiments, lane borders, three-dimensional objects, and moving three-dimensional objects may be detected.

Figure 13:
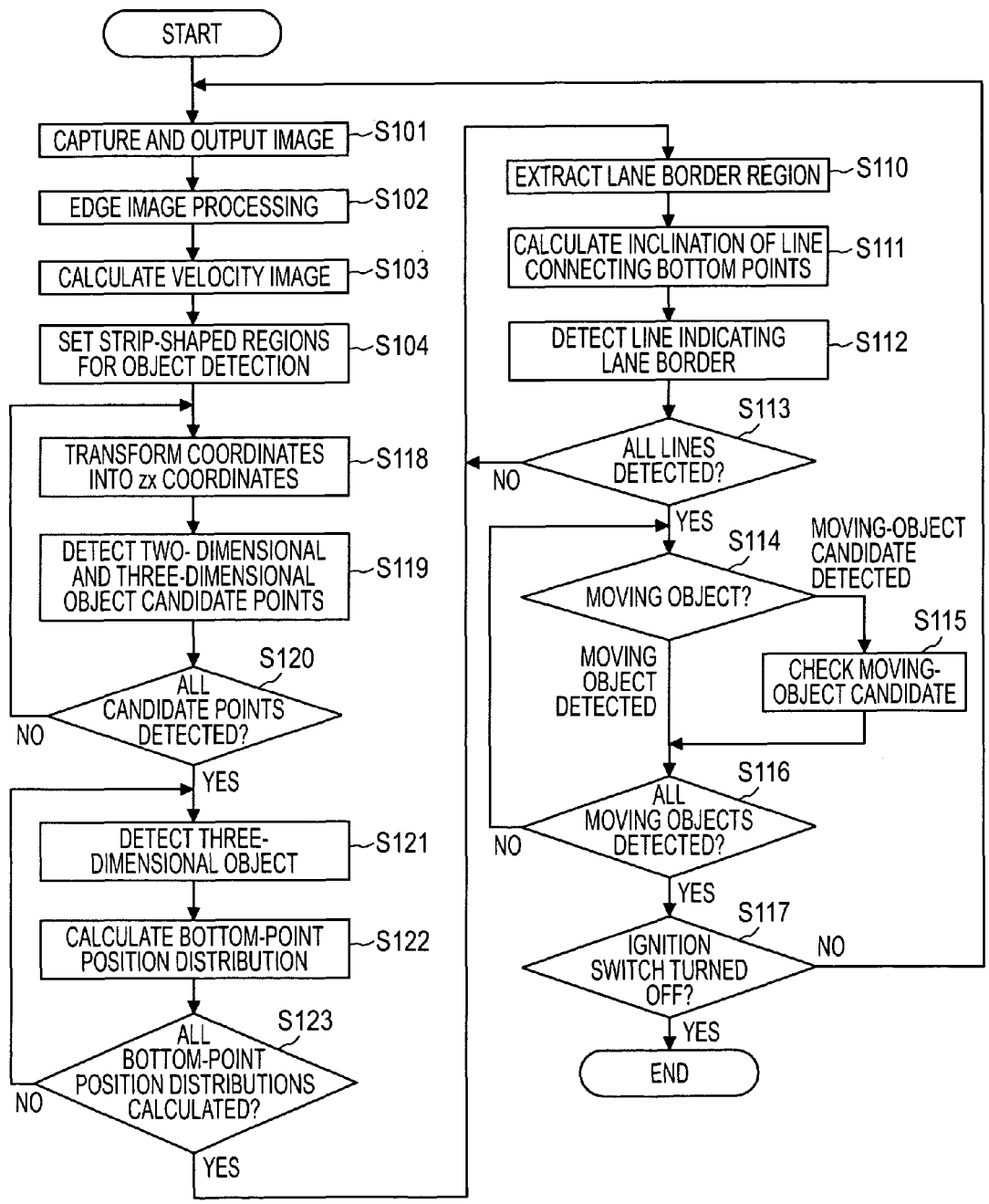
FIG. 13 is a flowchart showing a procedure performed by an object detecting system according to a second embodiment of the present invention.

FIG. 13 is a flowchart showing a procedure performed by the object detecting system 10 according to a preferred embodiment. This procedure is carried out as a program that is started in response to turning ON an ignition switch (not shown). In FIG. 13, steps that are the same as those described with respect to FIG. 10 are denoted by the same reference numbers, and any differences therebetween will be described below.

In a step S118, an image is scanned from bottom to top in each of the strip-shaped regions for object detection that were set in the step S104, and coordinates of pixels having velocities are transformed into coordinates on the ZX-plane according to expressions (1) and (2) described above.

In a step S119, when the coordinate-transformed points of the pixels lie in a specified ZX-plane, they are judged as being two-dimensional object candidate points. When the coordinate-transformed points do not lie in the specified ZX-plane, they are judged as being three-dimensional object candidate points.

In a step S120, it is determined whether all the pixels having the calculated velocities have been subjected to coordinate transformation onto the ZX-plane, and whether detection of two-dimensional object candidate points and three-dimensional object candidate points has been completed. When the detection has been completed, a step S121 is performed. In contrast, when the detection has not been completed, the step S118 is performed again.

In a step S121, when the two-dimensional object candidate points and the three-dimensional object candidate points are consecutively arranged in the vertical direction in each region, an object including the candidate points is judged as being one three-dimensional object.

In a step S122, the lowermost points of the objects that are judged as being both two-dimensional and three-dimensional are detected as bottom points in each region, and count values of counters in the regions on the ZX-plane including the coordinate-transformed bottom points are set to a numerical "one."

In a step S123, it is determined on the basis of the count values whether information about a positional distribution of the coordinate-transformed bottom points in each region has been calculated. When the calculation is completed, the step S110 is performed. In contrast, when the calculation is not completed, the step S121 is performed again.

Subsequently, lane borders, three-dimensional objects, and moving objects are detected by performing operations similar to those in the first set of preferred embodiments.

The above-described object detecting system of the second embodiment can provide the following operational advantages, in addition to the operational advantages of the first embodiment.

The object-attribute determining unit 107 judges the pixels to be two-dimensional object candidate points when the pixels lie in any of a plurality of three-dimensional regions, and judges the pixels to be three-dimensional object candidate points when the pixels exist outside the regions. The object-attribute determining unit 107 determines that the two-dimensional object candidate points and the three-dimensional object candidate points represent one three-dimensional object when the candidate points are consecutively arranged in the vertical direction of the image.

In this case, object detection regions are set on a velocity image calculated from an image captured by the camera 101, pixels having velocities are subjected to coordinate transformation onto the ZX-plane, and it is determined whether each of the pixels is a two-dimensional object candidate point or a three-dimensional object candidate point, on the basis of the transformed position coordinates of the pixels on the ZX-plane. When two-dimensional object candidate points and three-dimensional object candidate points are consecutively arranged in the vertical direction in the image, an object including the candidate points is judged as being one three-dimensional object. This operation allows a three-dimensional object to be precisely detected even when the pixels constituting the same object do not have the same calculated velocity by some influence.

Object detecting systems according to the above-described second set of preferred embodiments provide a number of features that are in addition to those of the first set of preferred embodiments and some of which will now be described.

The object detecting systems determine that a feature is a two-dimensional object candidate when all of the coordinate-transformed points of the pixels representing the feature lie in the specified ZX-plane, and determine that a feature is a three-dimensional object candidate when at least one of the coordinate-transformed points of the pixels representing the feature lie out of the specified ZX-plane. Further, it is determined that the two-dimensional object candidate points and the three-dimensional object candidate points represent a common three-dimensional object when the candidate points are consecutively arranged in a vertical orientation of the image.

Accordingly, object detection regions are set on a velocity image that is calculated from a captured image. Those pixels that have velocities in the velocity image are subjected to coordinate transformation onto the ZX-plane, and it is determined on the basis of the position coordinates of the coordinate-transformed points on the ZX-plane whether the pixels are two-dimensional object candidate points or three-dimensional object candidate points. When the two-dimensional object candidate points and the three-dimensional object candidate points are consecutively arranged in a vertical direction on the image, an object including the candidate points is judged as being a single three-dimensional object. This operation allows a three-dimensional object to be precisely detected even when the calculated velocities for the pixels that constitute the same object are not the same, for whatever reason.

It is envisioned that various design changes are possible within the scope of the preferred embodiments of the invention.

For example, the configuration of the object detecting system is not limited to the block diagram that is shown by FIG. 1, and may be configured differently, or with different components, as long as it produces a substantially similar function.

The installation position of the camera is not limited to the position illustrated in FIGS. 2A and 2B. The camera may be installed at any position as long as the optical axis of the camera points in a line of sight toward the front of the vehicle (i.e., in the Z-direction), and the horizontal axis (i.e., X-axis) and the vertical axis (i.e., the Y-axis) of the image capturing plane are respectively parallel to and perpendicular to the road surface.

Normalizing the width of a detected edge is not limited to three pixels, and may be set to any number of pixels that is suitable. Preferably, there is an odd number of pixels corresponding to the edge inasmuch as the center pixel is used during processing.

The number of regions into which the specified ZX-plane is split is not limited to a particular number of regions. Nor is grid limited to a particular pattern. That is to say, the numbers of vertical and horizontal ranges may be set to any suitable numbers. Thus, the specified ZX-plane may be split into any number of regions and into any grid pattern that are suitable.

The object detecting system 10 is preferably installed in a vehicle that travels on a road; however, installations in other types of mobile units that traverse other surfaces are envisioned.

A curb, a white line and a line defined by a wall and the road surface are described as examples of lane borders; however, it is also envisioned that other types of lane borders, e.g., a guard rail, a border defined by a parking vehicle and the road surface, and a border between the road surface and a different surface (e.g., a gravel shoulder, a soil field, etc.) may also be detected.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. An object detecting system for a vehicle moving along a surface, the object detecting system comprising:
   an imaging device disposed on the vehicle and capturing a two-dimensional image representing a scene ahead of the vehicle, the two-dimensional image having a vertical axis generally perpendicular to the surface and a horizontal axis generally parallel to the surface; and
   a controller receiving the image from the imaging device, the controller including:
      a feature extraction unit reading the image, extracting from the image edges of a feature, producing an image of pixels showing the edges of the feature, and normalizing the edges of the feature;
      a motion-information calculator evaluating the feature and outputting feature velocity information for each image pixel showing the normalized edges of the feature;
   a coordinate transformation unit reading two-dimensional position coordinates of the image pixels and outputting transformed three-dimensional position coordinates; and
      an object-attribute determination unit determining whether the feature is a moving object, the determining being based on the transformed three-dimensional position coordinates received from the coordinate transformation unit and on the feature velocity information received from the motion-information calculator.

2. The object detecting system according to claim 1, wherein the transformed three-dimensional position coordinates lie in a transformation plane that is generally parallel to the surface, and a grid splits a specified area on the transformation plane into a plurality of regions.

3. An object detecting system for a vehicle moving along a surface, the object detecting system comprising:
   an imaging device disposed on the vehicle and capturing a two-dimensional image representing a scene ahead of the vehicle, the two-dimensional image having a vertical axis generally perpendicular to the surface and a horizontal axis generally parallel to the surface; and
   a controller receiving the image from the imaging device, the controller including:
      a feature extraction unit reading the image and extracting from the image edges of a feature;
      a motion-information calculator evaluating the feature and outputting feature velocity information for each image pixel showing the edges of the feature;
      a coordinate transformation unit reading two-dimensional position coordinates of the image pixels and outputting transformed three-dimensional position coordinates; and
      an object-attribute determination unit determining whether the feature is a moving object, the determining being based on the transformed three-dimensional position coordinates received from the coordinate transformation unit and on the feature velocity information received from the motion-information calculator;
   wherein the image comprises a first feature represented by a first set of pixels and the determining by the object-attribute determination unit comprises: detecting that the first feature is a stationary object based on establishing that a first relationship exists between horizontal coordinates and velocity information for the first set of pixels, the first relationship being represented by a sloping line on a graph that plots horizontal coordinates along an abscissa axis and velocity along an ordinate axis; identifying that the collection of points is disposed on an opposite side of the abscissa axis with respect to the sloping line.

4. An object detecting system for a vehicle moving along a surface, the object detecting system comprising:
   an imaging device disposed on the vehicle and capturing a two-dimensional image representing a scene ahead of the vehicle, the two-dimensional image having a vertical axis generally perpendicular to the surface and a horizontal axis generally parallel to the surface; and
   a controller receiving the image from the imaging device, the controller including:
      a feature extraction unit reading the image and extracting from the image edges of a feature;
      a motion-information calculator evaluating the feature and outputting feature velocity information for each image pixel showing the edges of the feature;
      a coordinate transformation unit reading two-dimensional position coordinates of the image pixels and outputting transformed three-dimensional position coordinates; and
      an object-attribute determination unit determining whether the feature is a moving object, the determining being based on the transformed three-dimensional position coordinates received from the coordinate transformation unit and on the feature velocity information received from the motion-information calculator;
   wherein the image comprises a second set of pixels, and the determining by the object-attribute determination unit comprises: detecting that the second feature is a moving object based on establishing that a second relationship exists between horizontal coordinates and velocity information for the second set of pixels, the second relationship being represented by a collection of points plotted on the graph, the detecting that the second feature is a moving object including at least one of: identifying that the collection of points has a velocity magnitude different from the sloping line.

5. An object detecting system for a vehicle moving along a surface, the object detecting system comprising;
   an imaging device disposed on the vehicle and capturing a two-dimensional image representing a scene ahead of the vehicle, the two-dimensional image having a vertical axis generally perpendicular to the surface and a horizontal axis generally parallel to the surface; and
   a controller receiving the image from the imaging device, the controller including:
      a feature extraction unit reading the image and extracting from the image edges of a feature;
      a motion-information calculator evaluating the feature and outputting feature velocity information for each image pixel showing the edges of the feature;
      a coordinate transformation unit reading two-dimensional position coordinates of the image pixels and outputting transformed three-dimensional position coordinates; and
      an object-attribute determination unit determining whether the feature is a moving object, the determining being based on the transformed three-dimensional position coordinates received from the coordinate transformation unit and on the feature velocity information received from the motion-information calculator;
   wherein the transformed three-dimensional position coordinates lie in a transformation plane that is generally parallel to the surface, and a grid splits a specified area on the transformation plane into a plurality of regions;
   the object detecting system further comprising:
      a grouping unit associating in a group the image pixels that are 1) adjacent in the vertical direction of the image and 2) have relative feature velocity information that is within a predetermined range,
      wherein the determining by the object-attribute determination unit is based on the transformed three-dimensional positional coordinates of 1) a vertically uppermost pixel of the group of image pixels and 2) a vertically lowermost pixel of the group of image pixels.

6. The object detecting system according to claim 5, wherein the determining by the object-attribute determination unit comprises 1) determining that the feature is a two-dimensional object when the vertically uppermost pixel and the vertically lowermost pixel lie in the same one of the plurality of regions of the specified area of the transformation plane, and 2) determining that the feature is a three-dimensional object when the vertically uppermost pixel lies outside the specified area of the transformation plane and the vertically lowermost pixel lies in any of the plurality of regions.

7. The object detecting system according to claim 5, wherein the determining by the object-attribute determination unit comprises 1) determining that a two-dimensional object candidate is defined when the transformed three-dimensional positional coordinates of a first plurality of the group of image pixels lie in any of the plurality of regions, 2) determining that a three-dimensional object candidate is defined when the transformed three-dimensional positional coordinates of a second plurality of the group of image pixels lie outside of the plurality of regions, and 3) determines that the feature is a three-dimensional object when the transformed three-dimensional position coordinates of the two-dimensional object candidate and of the three-dimensional object candidate points represent one three-dimensional object when the two-dimensional object candidate points are consecutively arranged in the vertical direction of the image.

8. The object detecting system according to claim 5, wherein the determining by the object-attribute determination unit comprises determining at least one lane border for the vehicle, the determining being based on a plurality of transformed three-dimensional coordinates of vertically lowermost pixels being disposed along a vertical line on the transformation plane;
   wherein the determining is performed in each division of the image that is defined by the at least one lane border.

9. An object detecting system comprising:
   image capturing means for capturing an image of a scene ahead of a vehicle;
   feature extracting means for extracting normalized edges of a feature from the image captured by the image capturing means, the normalized edges being represented by pixels;
   motion-information calculating means for calculating feature velocity information about the pixels representing the normalized edges of the feature;
   coordinate transforming means for transforming position coordinates of the pixels into three-dimensional position coordinates of a three-dimensional coordinate system; and
   object-attribute determining means for determining whether the feature is a moving object, the determining being based on the three-dimensional position coordinates of the pixels and the feature velocity information.

10. An object detecting method for detecting a moving object in an image representing a scene ahead of the vehicle, the method comprising:
    preparing velocity information about a first set of pixels showing a feature of an object in the image;
    transforming two-dimensional coordinates of the first set of pixels into three-dimensional coordinates;
    determining whether the object is a moving object based on the prepared feature velocity information and on the transformed three-dimensional position coordinates;
    splitting into a plurality of regions a specified area of a transformation plane defined by the transformed three-dimensional position coordinates; and
    grouping together in a separate group those of the first set of pixels that are both adjacent in a vertical direction of the image and have relative velocity information that is within a predetermined range;
    wherein the determining is based on the transformed three-dimensional position coordinates of a vertically uppermost pixel of the group and of a vertically lowermost pixel of the group.

11. The object detecting method according to claim 10, wherein the determining comprises determining that the object is a two-dimensional when the vertically uppermost pixel and the vertically lowermost pixel lie in the same one of the plurality of regions, and 2) determining that the object is a three-dimensional when the vertically uppermost pixel lies outside the specified area of the transformation plane and the vertically lowermost pixel lies in any of the plurality of regions.

12. The object detecting method according to claim 10, wherein the determining comprises 1) determining that a two-dimensional object candidate is defined when the transformed three-dimensional positional coordinates of a first plurality of the group of image pixels lie in any of the plurality of regions, 2) determining that a three-dimensional object candidate is defined when the transformed three-dimensional positional coordinates of a second plurality of the group of image pixels lie outside of the plurality of regions, and 3) determines that the feature is a three-dimensional object when the transformed three-dimensional position coordinates of the two-dimensional object candidate and of the three-dimensional object candidate points represent one three-dimensional object when the two-dimensional object candidate points are consecutively arranged in the vertical direction of the image.

13. The object detecting method according to claim 10, wherein the determining comprises determining at least one lane border for the vehicle, the determining being based on a plurality of transformed three-dimensional coordinates of vertically lowermost pixels being disposed along a vertical line on the transformation plane;

wherein the determining is performed in each division of the image that is defined by the at least one lane border.

* * * * *